US007239321B2

(12) United States Patent
Berger

(10) Patent No.: US 7,239,321 B2
(45) Date of Patent: Jul. 3, 2007

(54) STATIC AND DYNAMIC 3-D HUMAN FACE RECONSTRUCTION

(75) Inventor: Michael A. Berger, Yorktown Heights, NY (US)

(73) Assignee: Speech Graphics, Inc., Mt. Kisco, NY (US)

( * ) Notice: Subject to any disclaimer, the term of this patent is extended or adjusted under 35 U.S.C. 154(b) by 586 days.

(21) Appl. No.: 10/649,844

(22) Filed: Aug. 26, 2003

(65) Prior Publication Data

US 2005/0057569 A1 Mar. 17, 2005

(51) Int. Cl.
*G06T 17/00* (2006.01)

(52) U.S. Cl. .................................................. 345/473

(58) Field of Classification Search ...................... None
See application file for complete search history.

(56) References Cited

U.S. PATENT DOCUMENTS

| 4,092,493 | A | * | 5/1978 | Rabiner et al. | ............. | 704/237 |
| 6,738,062 | B1 | * | 5/2004 | Moreton | .................... | 345/423 |
| 7,068,277 | B2 | * | 6/2006 | Menache | .................... | 345/473 |
| 2003/0160791 | A1 | * | 8/2003 | Breton et al. | ............... | 345/473 |
| 2004/0095352 | A1 | * | 5/2004 | Huang | ........................ | 345/473 |

OTHER PUBLICATIONS

Foley et al. Computer Graphics: Principles and Practice. Addison-Wesley Publishing Company, Inc. 1997. p. 166, 856.*
Gumhold et al. Multiresolution Rendering with Displacement Mapping. Proceedings of the ACM SIGGRAPH/EUROGRAPHICS workshop on Graphics hardware. 1999. p. 55-66.*
Kobbelt et al. Multiresolution Shape Deformations for Meshes with Dynamic Vertex Connectivity. EUROGRAPHICS. vol. 19, No. 3, 2000.*

J. Noh, "A Survey of Facial Modeling and Animation Techniques," University of Southern California Technical Report 99-705, 1998.
Y.F. Wang and J.K. Aggarwal, "An Overview of Geometric Modeling Using Active Sensing," IEEE Control Systems Magazine, vol. 8, No. 3, pp. 5-13, 1988.
P.J. Besl and N.D. McKay, "A Method for Registration of 3-D Shapes," IEEE Transactions on Pattern Analysis and Machine Intelligence, vol. 14, No. 2, pp. 239-256, 1992.

(Continued)

*Primary Examiner*—Ulka Chauhan
*Assistant Examiner*—Peter-Anthony Pappas
(74) *Attorney, Agent, or Firm*—Kenyon & Kenyon LLP

(57) ABSTRACT

A system for three-dimensional (3-D) facial animation, including a base 3-D surface model representing a human face, and a set of displacement fields representing surface motion patterns associated with muscle movements. Each displacement field is a displacement vector varying over vertices of the base surface model and an intensity variable. Both the base surface model and displacement fields are acquired from a live subject by 3-D acquisition. The data are acquired using a surface acquisition system, capable of measuring the coordinates of a set of points on the subject's face and reconstructing the facial surface as a surface model. The base surface model is acquired by reconstructing the surface of the subject's face in the neutral pose. Each displacement field is acquired by reconstructing the surface of the subject's face in a series of poses of a muscle movement at increasing intensities. This results in a sequence of surface models exhibiting the changing shape of the face over the progress of the muscle movement. The displacement field is derived by calculating displacements at each selected intensity value and then interpolating over the known displacements.

51 Claims, 10 Drawing Sheets

OTHER PUBLICATIONS

G. Turk and M. Levoy, "Zippered Polygon Meshes from Range Images," Computer Graphics Proceedings, ACM SIGGRAPH '94, pp. 311-318, 1994.

B.K. P. Horn, "Closed-Form Solution of Absolute Orientation Using Unit Quaternions," Journal of the Optical Society of America, vol. 4, No. 4, pp. 629-642, 1987.

F. Lazarus and A. Verroust,"Three-Dimensional Metamorphosis: A Survey," The Visual Computer, vol. 14, No. 4, pp. 373-389, 1998.

M. Eck et al., "Multiresolution Analysis of Arbitrary Meshes," Proceedings of ACM SIGGRAPH '93, ACM Press, pp. 27-34, 1993.

T. Kanai et al., "Three-Dimensional Geometric Metamorphosis Based on Harmonic Maps," The Visual Computer, vol. 14, No. 4, pp. 166-176, 1998.

M. Zöckler et al., "Fast and Intuitive Generation of Geometric Shape Transitions," The Visual Computer, vol. 16, No. 5, pp. 241-253, 2000.

P. Ekman and W.V. Friesen, *Manual for the Facial Action Coding System*, Consulting Psychologists Press, Palo Alto, CA 1978.

\* cited by examiner

10

11

12

13

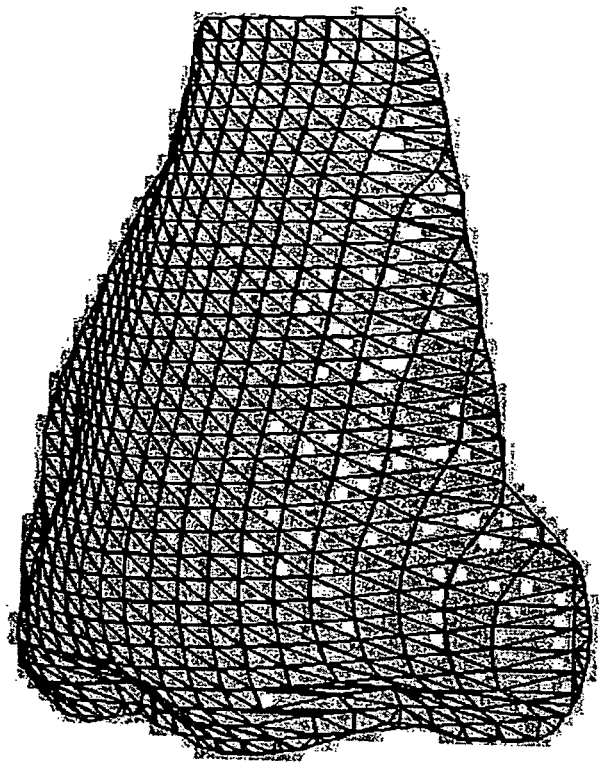
FIG. 10
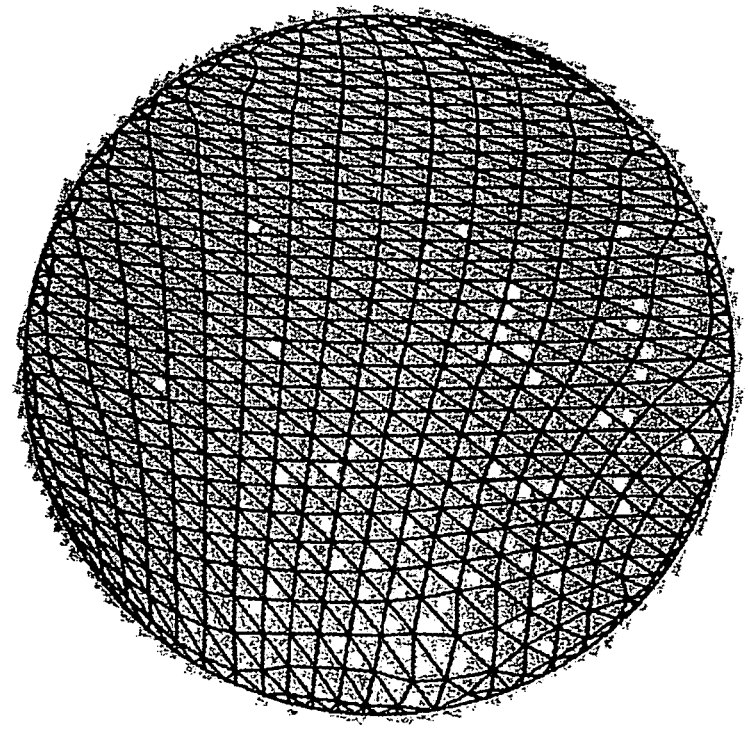

STATIC AND DYNAMIC 3-D HUMAN FACE RECONSTRUCTION

FIELD OF THE INVENTION

The present invention relates to the field of three-dimensional (3-D) modeling and animation by computer, and in particular to a method of building deformable 3-D models of human faces by reconstructing both the shape and motion patterns of a subject's face.

BACKGROUND INFORMATION

Three-dimensional computer animated actors may be useful in a variety of applications. For example, they may be employed for entertainment or educational purposes in film and television, where advanced techniques in 3-D modeling, kinematics and rendering allow the creation of realistic-looking action without the constraints of filming real actors. Computer animated actors may also play an integral role in 3-D video games and virtual reality, where they may help to achieve the goal of synthesizing realistic, interactive 3-D worlds.

Computer-animated actors may also be useful as a communication tool. In computer user interfaces, communication between the computer and the user may be carried out mainly through text. Instead, the computer may use an animated actor to communicate with the user. This may be accomplished by generating voice from the text using text-to-speech synthesis, while synchronizing the movements of the actor's face with the synthetic voice, by matching the pose of the face to the current sound. Substituting text with a humanoid talking actor may give the user a more personal, entertaining and engaging experience, and may reduce user fatigue caused by reading. Such a text-driven animated actor may be added to any application that relies on text, including web-based applications.

An important aspect of animating humans by computer is capturing the subtle and complex structure and movement of the human face. The face is commonly the focus of viewers' attention, especially during close-ups and when actors are speaking, and people are innately sensitive to even very small changes in expression. Therefore, accurately modeling and animating the human face may be viewed as a critical objective within the broader field of 3-D human animation.

Techniques for 3-D computer facial modeling and animation are reviewed in F. I. Parke and K. Waters, Computer Facial Animation, A. K. Peters, Wellesley, Mass., 1996, and in J. Noh, "A survey of facial modeling and animation techniques," University of Southern California Technical Report 99-705, 1998. A 3-D model of a face may be developed using a variety of surface representations, such as, for example, polygonal or parametric surfaces. A polygonal surface is composed of a set of polygonal facets, such as triangles, joined at the edges. Parametric surfaces are composed from bivariate spline functions, also known as spline "patches."

Realistic 3-D models of faces may be acquired readily from live subjects through various shape measurement techniques involving the use of active sensing, which casts special illumination onto an object in order to measure it. (For details on shape measurement by active sensing, see Y. F. Wang and J. K. Aggarwal "An overview of geometric modeling using active sensing", in IEEE Control Systems Magazine, vol. 8, no. 3, pp. 5-13, 1988.) A variety of commercial shape capture systems using active sensing may be available, such as the 3030RGB/PS laser scanner of Cyberware Inc., Monterey, Calif.; the ShapeSnatcher light system of Eyetronics Inc., Belgium; or the 3DFlash! light system of 3DMetrics, Inc., Petaluma, Calif.

While accurate static models of faces may be readily and automatically acquired, animating the models realistically may be less straightforward. The task may involve determining appropriate deformations of the model. To limit the problem, a small set of reusable deformation procedures may be designed, which may be handled conveniently by a human animator or by an external program to generate deformations. An appropriate set of deformation procedures may simulate natural muscle movements of the human face. These muscle-like deformation procedures may be used in combination to simulate complex activities such as speech and emotional expression. The task of generating realistic facial animation thus may reduce to the task of designing a set of realistic muscle-like deformation procedures.

Procedures for muscle-like deformation of 3-D facial models may be classified into the following types: force propagation, displacement propagation, free-form deformation and direct surface displacement.

In a force propagation scheme, a facial model may include a representation of facial anatomy including elements corresponding to skin, muscle and bone. For the skin representation, multiple layers of skin tissue may be represented by an elastic spring lattice or a finite element model. For muscles, each muscle fiber may be represented as a vector between a skin node and an immobile bone attachment. Contraction of the muscle fiber results in pulling the skin attachment in the direction of the bone attachment. The force applied to one skin node is then propagated across the face through the skin tissue model.

This approach to facial deformation may require a great deal of data to reconstruct the complex underlying anatomy of the face and its physical properties, which may vary across features of the face. This may make such models painstaking to design. Furthermore, to compute the propagation of muscle contraction forces throughout the model may be computationally expensive.

To generate muscle-like deformation with less in-depth modeling and lighter computation loads, surface deformations may be computed more directly, without attempting to reconstruct the complex underlying anatomy and physical processes that lead to the deformations. Examples of these more result-oriented deformation control schemes may include the displacement propagation, free-form deformation and direct surface displacement methods.

A displacement propagation approach represents skin as an infinitesimally thin surface, with muscle fibers represented by vectors beneath the skin surface. Each vector has one moveable endpoint and one fixed endpoint. To simulate muscle contraction, the moveable endpoint of the vector moves in the direction of the fixed endpoint. As the moveable endpoint is displaced toward the fixed endpoint, control points on the skin surface within a zone of influence of the muscle vector are also displaced in the direction of the fixed endpoint. The magnitude of the displacement of each control point in the zone of influence may be a function of its angular distance from the muscle vector and its nearness to the immobile endpoint. The magnitude of displacement may also be affected by a skin elasticity factor.

In free-form deformation, a surface is deformed by manipulating an invisible, flexible bounding box in which the surface is embedded. As the bounding box is deformed by manipulating its control points, the embedded surface deforms accordingly. Free-form deformation may be used to simulate muscle-like actions by displacing control points of a bounding box along particular trajectories.

In both of the two preceding techniques—displacement propagation and free-form deformation—a facial model involves a simple surface controlled by the displacement of secondary structures, whether muscle vectors or a bounding box. On the other hand, in the direct surface displacement method, the displacement of the surface is described directly, not as a function of the displacement of some other structure. The displacement of a group of control points in the surface may be described by a parametric equation, for example.

While these three method—displacement propagation, free-form deformation and direct surface displacement—all may involve less complex models and less intensive computation than the force propagation method, such deformation schemes may nevertheless require significant painstaking effort to design. In each case, it may be necessary to specify the various data and functions that will engender the desired surface deformations. For example, in the displacement propagation approach, one may be required to specify the placement and zone of influence of each muscle vector, and possibly an elasticity parameter over the skin surface; in free-form deformation, the bounding box may need to be specified as well as the displacement trajectories of its control points; and for direct surface displacement, one may be required to design the equations to govern the trajectories of the control points. These data may need to be supplied by artistic interpretation of facial deformations. Furthermore, the greater the desired realism and accuracy of the deformations, the more labor and skill may be required to specify the deformation procedures.

SUMMARY OF THE INVENTION

An object of the present invention is to provide a facial animation system incorporating a 3-D facial model, with deformation procedures simulating natural muscle movements. A further object is to provide a system and method for constructing both the facial model and its deformation procedures through the use of 3-D acquisition. To determine the model, the static shape of an actor's face is acquired by 3-D shape measurement, and to determine the deformation procedures, the surface displacements associated with muscle movements are acquired by 3-D measurement of displacement. This may result in a high-fidelity reconstruction of the actor's face both statically and dynamically.

Acquiring surface displacements by 3-D measurement may be desirable for several reasons. First, this approach may require significantly less labor and skill, since the data for generating displacements may be supplied by measurements rather than being specified by the practitioner. Second, the resulting deformations may naturally have a high level of realism, since the displacements are copied directly from a real person's face. Third, there may a natural "fit" between the movements and structure of the facial model, since both are acquired from the same subject. Fourth, reconstructing facial displacements by measurement, rather than by artistic interpretation, may provide better fidelity to the subject's face in cases where one wishes to animate the face of a specific person such as a celebrity, a company executive, or a person whose facial features may be desirable.

The present invention provides a system for facial animation, including a base 3-D surface model representing a human face, and a set of displacement fields representing displacement patterns produced by basic muscle movements called "action units." The base surface model may include a topological model, representing a set of vertices and connections between them, and a set of 3-D positions corresponding to the vertices, which determine an embedding of the topological model in 3-D space. Each displacement field may be a 3-D displacement vector varying over the vertices of the base surface model and over an intensity variable.

A deformation unit may perform a deformation procedure on the base surface model by applying the displacement fields. The deformation unit may receive as input one intensity value for each displacement field. Given the input intensity value for each displacement field, the deformation unit may determine the displacement at each vertex due to the displacement field. The displacements accumulated at each vertex may be blended together and added to the original position of the vertex, resulting in a set of deformed vertex positions, which determines a deformed surface model. The deformed surface model may be output to a rendering unit, which may use color data and 3-D rendering techniques to convert the deformed surface model into a visual image. Continuously adjusting the intensity values of the displacement fields generates a sequence of deformed surface models, rendered as a sequence of animation frames depicting a face in motion.

A further example system and method may be provided whereby both the base surface model and displacement fields are acquired from a live subject by 3-D acquisition. These data may be acquired using a surface acquisition system, which is capable of measuring the coordinates of a set of points on the subject's face and reconstructing the facial surface as a surface model. The surface acquisition system may also acquire a photographic image of the face at the same time as the 3-D data, which image may be mapped to the surface model as a texture.

The subject may perform a series of facial poses, each of which the surface acquisition system may measure and reconstruct as a surface model. To produce the base surface model, the subject may perform a neutral relaxed pose. For each displacement field, the subject may perform a series of poses of an action unit at increasing degrees of muscle contraction. This results in a sequence of surface models exhibiting the changing shape of the face over the progress of the action unit. A sequence of selected intensity values may be associated with this sequence of surface models, representing the degree of muscle contraction for each pose.

To extract a displacement field representing the action unit from this sequence of surface models, it may be desirable for the sequence to isolate the displacement effects of the action unit from other sources of displacement, including other action units, displacements of the jaw and head movement. Preventing the incursion of other action units may require some proficiency on the part of the subject, including the ability to pose the action unit in isolation, without extraneous muscles activating simultaneously. To prevent undesirable jaw displacement between successive poses the subject's jaw may be immobilized. Differences in head position between poses may be eliminated after the poses have been reconstructed as surface models, using a 3-D registration technique. 3-D registration refers to computing a rigid transformation that brings one 3-D object into alignment with another 3-D object. An example registration method is provided.

Once a sequence of surface models representing an action unit has been acquired, the displacement field of the action unit may be extracted from the sequence of surface models by the following steps: 1) Fit the base surface model to each of the surface models in the sequence. 2) For each intensity value in the sequence of intensity values, determine the displacements of the vertices at that intensity value by calculating the change in position of the vertices from their positions relative to the lowest intensity value to their positions relative to the given intensity value. 3) Derive a continuous displacement field by interpolating over the displacements of the vertices at the intensity values in the sequence of intensity values.

The model fitting procedure referred to in step (1) above may involve re-positioning the vertices of the base surface model to approximate the target surface model. It may be desired that the positions of the vertices in any pose approximate the positions of the material points on the subject's face which the vertices represent. In this manner, the displacement of the vertices between any pair of poses may accurately reconstruct the displacements of the corresponding material points.

An exemplary model fitting procedure may involve a surface map to map the vertices of the base surface model to positions in the target surface model. A sparse initial mapping may be provided by mapping patches of the base surface model to patches of the target surface model. Then, vertices in a given patch of the base surface model may be mapped to appropriate locations in the corresponding patch of the target surface model.

In order to facilitate correct re-positioning of the vertices of the base surface model, it may be desirable for corresponding patches of the base surface model and the target surface model to approximate the configuration of the same region of the subject's face in different poses. To define corresponding patches which approximate the same region of the subject's face, the photographic image acquired with the surface model may be used as a guide. This image may be mapped to the surface model by texture mapping. Specifically, lines drawn on the subject's face delineating patches may appear embedded in each surface model via texture mapping, and these embedded lines may be used to define the patches in the surface model.

Once corresponding patches have been established in each surface model, the vertices of the base surface model may be mapped to positions in the target surface model in three groups: First, vertices which are at branching points in the network of patch boundaries may be mapped to the corresponding branching points in the target surface model. Second, vertices which lie on the patch boundaries of the base surface model may be mapped to corresponding segments in the network of patch boundaries of the target surface model. Third, vertices of the base surface model which lie in the interior of patches may be mapped to the interior of corresponding patches in the target surface model, using a harmonic mapping technique.

From the above example system and example methods, numerous example embodiments may be contemplated. These example embodiments remain within the scope of the present invention. Further features of the present invention are more apparent from the accompanying drawings and the following detailed description of the example embodiments.

BRIEF DESCRIPTION OF THE DRAWINGS

FIG. 7b illustrates the net result of modifying the sets of vertex positions, vertices, edges and triangles in the surface model to approximate the embedded line shown in FIG. 7a.

FIG. 10 illustrates an original embedding of an exemplary patch of a triangle mesh (corresponding to a nose), and its embedding in the unit disk based on a harmonic mapping.

DETAILED DESCRIPTION

Figure 1:
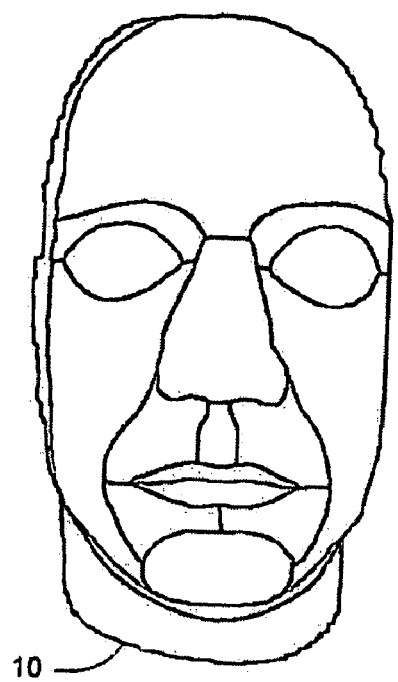
FIG. 1 schematically illustrates a face in the neutral pose and performing three action units (AU's) at maximum intensity, with an exemplary network of drawn lines dividing the face into featurally based regions.
Figure 1:
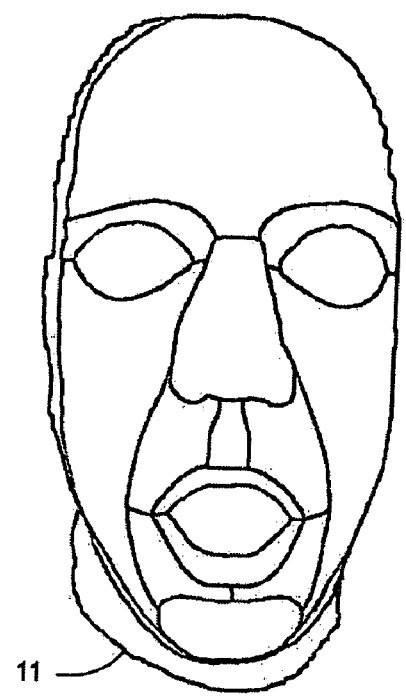
Figure 1:
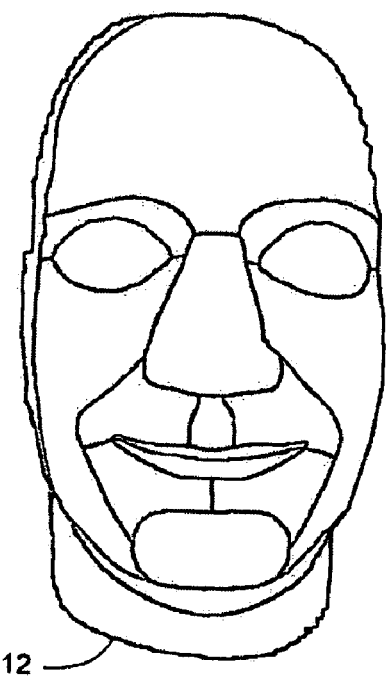
Figure 1:
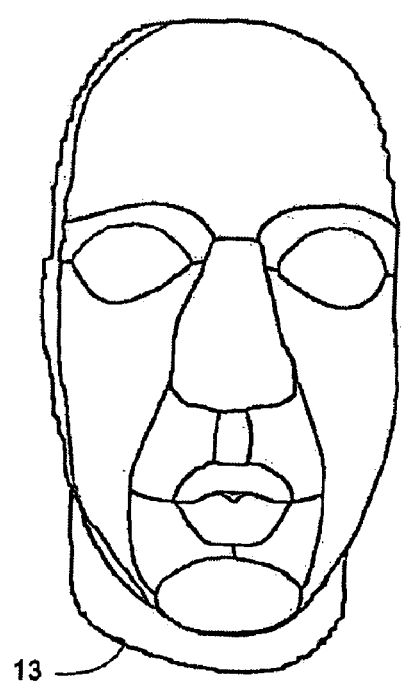

Following are definitions of terms and notation used in this description.

Topological Models

A "topological model" or "graph" is defined as a set of points, called "vertices," and a set of connections between pairs of them, called "edges." An edge between two vertices i and j is represented as a set $\{i,j\}$. Formally, a graph G is herein defined as a set comprising the union of i) a set of vertices, denoted V(G), and
 ii) a set of edges, denoted E(G), where $V(G)=\cup E(G)$. A "sub-graph" H of G is a graph such that $H \subset G$.

Given a graph G, a "path" H in G is a sub-graph $H \subset G$ with edges of the form $E(H)=\{\{i_0,i_1\}, \{i_1,i_2\}, \{i_2,i_3\}, \ldots, \{i_{n-1},i_n\}\}$. The vertices $i_0$ and $i_n$ are called the "terminal vertices" of the path. The path is called a "cycle" if $i_0=i_n$. G is called "connected" if for every pair of vertices i and j in V(G) there exists a path in G of which i and j are the terminal vertices.

A "triangle" in G is a cycle of three edges connecting three vertices—for example, $\{i,j,k,\{i,j\},\{j,k\},\{k,i\}\}$ is a triangle. A shorthand representation for a triangle is the set of its three vertices; for example, $\{i,j,k\}$ is shorthand for triangle $\{i,j,k,\{i,j\},\{j,k\},\{k,i\}\}$.

A "triangle mesh" is a graph in which every vertex and every edge is included in at least one triangle. Formally, a triangle mesh M may be defined as a set comprising the union of i) a set of vertices, denoted V(M),
 ii) a set of edges, denoted E(M), and
 iii) a set of triangles, denoted T(M), where $V(M) = \cup E(M)$ and $V(M) \cup E(M) = \cup T(M)$. A "submesh" N of M is a triangle mesh such that $N \subset M$. A "boundary" B of M is a cycle in M such that each edge in E(B) is included in exactly one triangle in T(M). If M has exactly one boundary, that boundary may be denoted $\partial M$. A "patch" P of M is a sub-mesh of M with exactly one boundary.

Surface Models

A geometric model of a surface may be formed by pairing a topological model such as a triangle mesh with a set of points, on the basis of which the topological model may be embedded in three-dimensional Euclidean space. To this end, a "surface model" may be defined as a pair (P,M), where M is a triangle mesh and $P = \{\vec{p}_i\}$ is a set of points in $\Re^3$ in (1-1) correspondence with the vertices V(M), such that point $\vec{p}_i$ corresponds to vertex i. On the basis of P each of the elements of M may be embedded in $\Re^3$. The embedding of each vertex $i \in V(M)$ on P, written |P,i|, is the point $\vec{p}_i$, called the "position" of the vertex. The embedding of each edge $\{i,j\} \in E(M)$ on P, written |P,{i,j}|, is a curve between the positions of its two vertices $\vec{p}_i$ and $\vec{p}_j$, or in an example embodiment, the closed line segment $\vec{p}_i \vec{p}_j$. The embedding of each triangle $\{i,j,k\} \in T(M)$ on P, written |P,{i,j,k}|, is a surface between the embeddings of its three edges, or in an example embodiment, the closed (geometric) triangle between $\vec{p}_i \vec{p}_j$, $\vec{p}_j \vec{p}_k$ and $\vec{p}_k \vec{p}_i$—i.e., $\vec{p}_i \vec{p}_j \vec{p}_k$. If N is any subset of M, $N \subseteq M$, the embedding of N on P, denoted |P,N|, is the union of the embeddings of the elements of N, i.e., $|P,N| = \cup_{x \in N} |P,x|$.

The full embedding of M, |P,M|, is thus a subset of $\Re^3$ including i) P, ii) the embedding of each edge of E(M), and iii) the embedding of each triangle of T(M).

Note that |P,M| is a piecewise linear interpolation of P. If P is a set of measured points on a real-world object, then |P,M| may be an approximation of the continuous surface of that object.

Hereinafter, if a surface model (P,M) is referred to in the sense of a geometric object, it will be understood that what is meant is the geometric object which it determines, |P,M|.

Facial Movement Analysis

Movement on a human face may be analyzed into basic movement processes called "action units." An action unit, or AU, may be defined as an isolable facial movement due to the contraction of a particular muscle or muscle group in the human face. In principle, any facial expression, whether involved in speech, affect, or some other behavior, may be decomposed into a set of one or more AU's.

A comprehensive analysis of the action units of the human face is provided in the Facial Action Coding System ("FACS") of P. Ekman and W. V. Friesen, presented in Manual for the Facial Action Coding System, Consulting Psychologists Press, Palo Alto, Calif., 1978. FACS is a system for describing facial expressions in terms of AU's. The table below lists a sampling of FACS AU's with descriptions.

| FACS AU | Description |
|---|---|
| AU-2 | Outer brow raiser; pulls the outer portion of the eyebrows upwards. |
| AU-4 | Brow lowerer; lowers the eyebrows and may narrow the eyes. |
| AU-27 | Jaw descender; lowers the jaw, causing the mouth to open. |
| AU-18 | Lip pucker; draws the lips towards the center of the mouth and pushes them outwards, forming the rounded lip shape of the vowel /uw/ as in "suit". |
| AU-12 | Lip corner puller; pulls the corners of the mouth laterally and upwards. |
| AU-16 | Lower lip depressor; pulls the lower lip down and stretches it laterally. |
| AU-24 | Lip presser; adducts the lips as in the consonant /m/. |
| AU-17 | Chin raiser; pushes the chin boss upward, raising the lower lip. |

"Articulated" AU's are AU's that govern the position of the jaw bone, such as AU-27. Articulated AU's may move the jaw bone vertically, laterally or protrusively. AU's which do not move the jaw bone, but rather affect only the soft tissues of the face, may be called "unarticulated."

Each AU may vary in "intensity," which refers to the degree to which the face is displaced by the AU, or to the degree of underlying muscle contraction. The intensity of an AU may be rated on a scale from 0 to 1, in which 0 represents an undisplaced or relaxed state, and 1 represents a maximally displaced or maximally contracted state.

One may identify a unique facial pose, called the "neutral pose," in which every AU of the face is at 0 intensity: the face is relaxed and expressionless, and the jaw is undisplaced—i.e., the teeth are set together.

FIG. 1 illustrates an exemplary neutral pose 10, and the following three AU's at maximum intensity: jaw descender (AU-27) 11; lip corner puller (AU-12) 12; and lip pucker (AU-18) 13.

Figure 2:
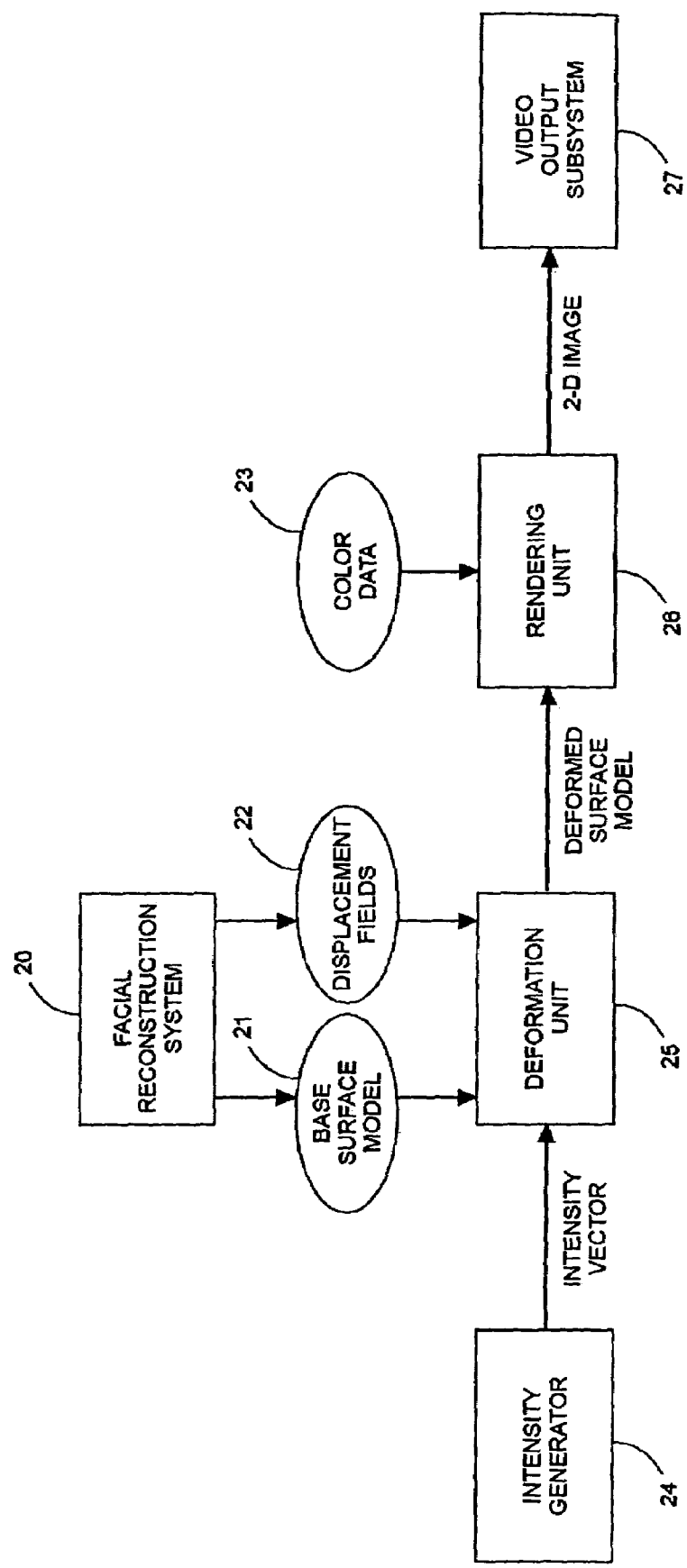
FIG. 2 illustrates a block diagram of a facial animation system according to an exemplary embodiment of the present invention.

FIG. 2 illustrates a schematic block diagram of a facial animation system according to an example embodiment of the present invention. As illustrated in FIG. 2, the facial animation system includes a facial reconstruction system 20, a base surface model 21, a set of displacement fields 22, color data 23, an intensity generator 24, a deformation unit 25, a rendering unit 26 and a video output subsystem 27.

The base surface model 21, denoted ($P^{base}, M^{base}$), is a 3-D surface model as defined above, with triangle mesh $M^{base}$ and vertex positions $P^{base} = \{\vec{p}_i^{base}\}$. In an example embodiment of the invention, the shape of ($P^{base}, M^{base}$) is that of a human face in the neutral pose.

The displacement fields 22 model the action units (AU's) of the human face as surface motion patterns. Let a set of N modeled AU's have indices 1, 2, ..., N. The displacement fields 22 modeling these AU's are denoted $\vec{d}_1, \vec{d}_2, \ldots, \vec{d}_N$, where $\vec{d}_k$ models the AU with index k. Each displacement field $\vec{d}_k$ may be defined as a function $$\vec{d}_k : V(M^{base}) \times I \rightarrow \Re^3$$

which is a 3-D displacement vector varying over the vertices $V(M_{base})$ and the intensity range of the AU, $I = [0,1]$. Since at the bottom of its intensity range an AU generates no displacement, at u=0 the displacement vector $\vec{d}_k(i,u)$ may equal $\vec{0}$ (the zero vector) for all $i \in V(M^{base})$. Increasing intensity values may cause increasing displacement at vertices in $V(M^{base})$, simulating the surface effect of the AU.

Figure 3:
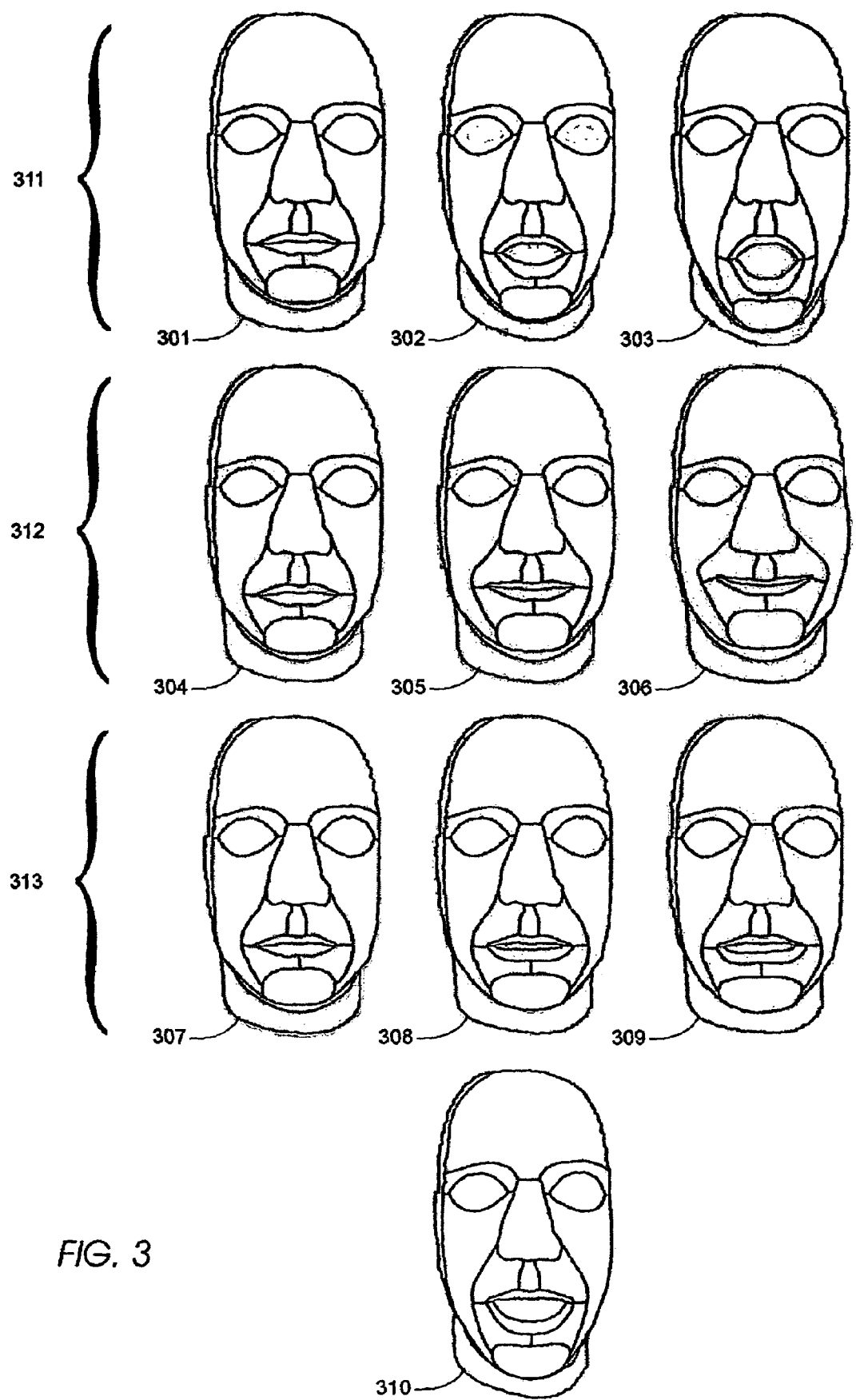
FIG. 3 schematically illustrates the control over the shape of the deformed surface model using the intensity variables of the displacement fields, including the independent use of three intensity variables and their combined use.

The deformation unit 25 deforms the vertex positions of the base surface model 21 using the displacement fields 22. The deformed vertex positions are denoted $P^{def} = \{\vec{p}_i^{def}\}$. The deformation of the vertex positions is controlled by the intensity of the displacement fields. As illustrated in FIG. 3, the intensity generator 24 generates and outputs to deformation unit 25 an "intensity vector" $\vec{u} = (u_1, u_2, \ldots, u_N)$, which supplies a current intensity value $u_k$ for each displacement field $\vec{d}_k$.

Given an input intensity vector $\vec{u}$, the deformed position of each vertex $i \in V(M^{base})$, $\vec{p}_i^{def}$, may be calculated as follows. Based on their current intensity values, the displacement fields $\vec{d}_k$ each provide a displacement at each vertex i, $\vec{d}_k(i, u_k)$. With each displacement field providing a displacement at i, there accumulates at i a collection of displacements $\{\vec{d}_k(i, u_k) | 1 \leq k \leq N\}$. To determine the current position of i, some blend of these displacements is added to the original position of i, $\vec{p}_i^{base}$, by vector sum. The displacements are blended by a "blend operator," denoted $\oplus$.

$$\vec{p}_i^{def} = \vec{p}_i^{base} + \bigoplus_{k=1}^{N} \vec{d}_k(i, u_k)$$

In an example embodiment of the invention, the blend operator is a vectorial sum.

$$\bigoplus_{k=1}^{N} \vec{d}_k(i, u_k) = \sum_{k=1}^{N} \vec{d}_k(i, u_k)$$

Once the deformed position of each vertex in $V(M^{base})$ is calculated, the deformation unit outputs the "deformed surface model" $(P^{def}, M^{base})$, which combines the set of deformed vertex positions with the triangle mesh of the base surface model. Varying the values in the intensity vector over time changes the deformed vertex positions, which changes the shape of $(P^{base}, M^{base})$ and thus simulates movement.

In a further exemplary embodiment of the invention, the deformed surface model may be further processed by the deformation unit prior to output. For example, the surface model may be smoothed by applying a fairing algorithm at the vertex positions.

FIG. 3 schematically illustrates the control over the shape of the deformed surface model using the intensity variables of the displacement fields 22. Cells 301, 302 and 303, collectively row 311, illustrate the effect of a displacement field representing AU-27 (jaw descender). In 301, the intensity for the displacement field is 0 (the undisplaced state); in 302, the intensity is at an intermediate value; and in 303, the intensity is 1 (the maximally displaced state). Rows 312 and 313 similarly illustrate the effects of displacement fields representing AU-12 (lip corner puller) and AU-16 (lower lip depressor), respectively, each at three different intensities (0, intermediate, 1). Cell 310 depicts the deformed surface model in a state in which all three displacement fields are at the intermediate intensity values simultaneously. In other words, 310 illustrates the deformed surface model with a blend of the displacements illustrated in 302, 305 and 308. The combined expression in 310 is the facial posture for the articulation of the English vowel /œ/as in "sat".

As illustrated in FIG. 2, the deformed surface model $(P^{def}, M^{base})$ is output to the rendering unit 26. The rendering unit 26 is responsible for rendering the 3-D surface $|P^{def}, M^{base}|$ as a 2-D image. The 2-D image may take the form of a bitmap. The rendering unit may use conventional 3-D rendering techniques, including, for example, lighting, smooth-shading, texturing, depth buffering and perspective projection, to translate the 3-D surface into a 2-D image. Color data 23 may include data associated with the base surface model 21 which may be used by the rendering unit in determining the coloration of the rendered image. For example, color data may include material properties associated with the vertices of $M^{base}$, or may provide other data relevant to surface coloring such as textures or bump maps.

In sum, each intensity vector generated by the intensity generator 24 is translated via deformation unit 25 and rendering unit 26 into a 2-D image or bitmap. A sequence of intensity vectors leads to a sequence of images, depicting the face in motion. Each 2-D image is sent to video output subsystem 27, which may include: a framebuffer, which stores the received bitmap; a digital-to-analog converter, which converts the digital pixel values of the bitmap in the framebuffer to analog signals, and a display device such as a CRT monitor, which converts the analog signals into visible images. With simple modifications, the video output subsystem may be configured to direct video output to devices other than a display monitor. For example, video output may be stored onto videotape, hard disk, or other storage media.

Figure 4:
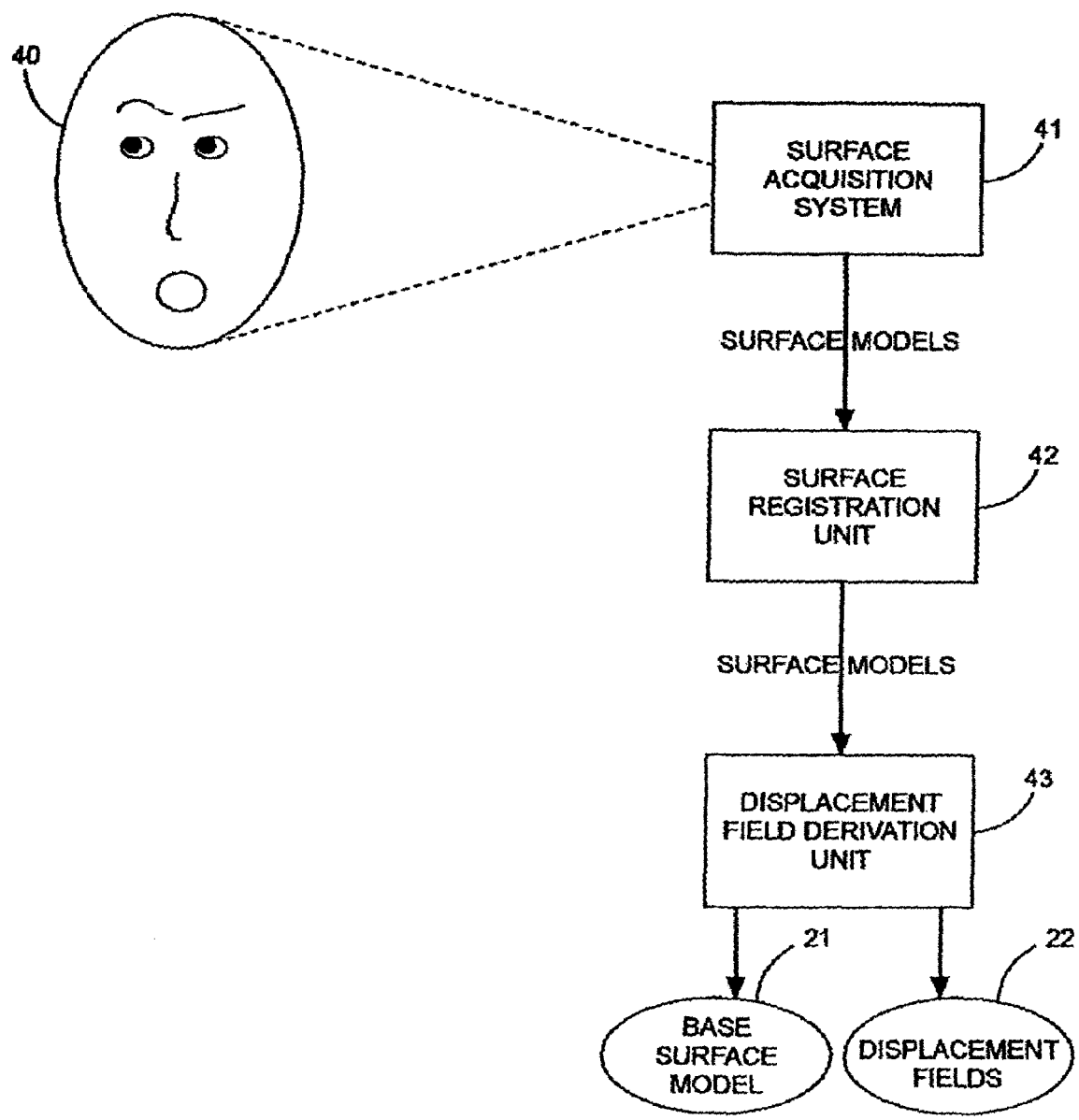
FIG. 4 illustrates example internal components of the facial reconstruction system included in the facial animation system illustrated in FIG. 2.

Facial reconstruction system 20 may be used to acquire both the base surface model 21 and displacement fields 22 from a live subject's face by measurement. Alternatively, the base surface model 21 and displacement fields 22 may be acquired in part or in whole by artistic design and/or other suitable 3-D modeling techniques. Exemplary components of the facial reconstruction system 20 are illustrated in greater detail in FIG. 4. As illustrated, the exemplary components of the facial reconstruction system 20, a surface acquisition system 41 to acquire information and/or data regarding a subject 40 (e.g., a live human subject), a surface registration unit 42 and a displacement field derivation unit 43.

The surface acquisition system 41 includes devices and software programs capable of reconstructing the face of subject 40 as a surface model. As described below, using the surface acquisition system to reconstruct the subject's face in a variety of poses may lead to the acquisition not only of the base surface model 21 but also of the displacement fields 22.

The functionality of the surface acquisition system in acquiring a surface model may be divided into two steps: surface measurement and surface reconstruction. Surface measurement refers to measuring the 3-D coordinates of a set of points on an object. Surface reconstruction refers to constructing a topological model of the surface (such as a triangle mesh) which may be embedded on the basis of the 3-D points, resulting in a continuous approximation of the surface.

In an example embodiment of the invention, to perform surface measurement, the surface acquisition system may utilize active sensing. In active sensing, special illumination may be cast onto an object in order to measure it. The projected pattern of light may be in the form of a point, a line, a set of parallel lines, or an orthogonal grid. This specially illuminated scene is viewed from one or more camera positions, and the 2-D images are analyzed to extract a set of 3-D points. (For details see Y. F. Wang and J. K. Aggarwal, "An overview of geometric modeling using active sensing", in IEEE Control Systems Magazine, vol. 8, no. 3, pp. 5-13, 1988).

For the purpose of measuring the surface of a face, active sensing may be superior to passive sensing techniques such as close range photogrammetry or optical position tracking. In a passive sensing approach, 3-D locations are determined by imaging an object from at least two camera positions, with no special illumination. The 3-D coordinates of a point on the object are measured by locating the point in each 2-D image and applying a geometric transformation. Since the point must be identified in each image, only the positions of identifiable features may be obtained. On a face, these features may often be supplied artificially, e.g. by markers glued onto the surface of the face. The number of markers that are used may be relatively limited, and consequently so may be the density of the surface measurement. On a face, the number of markers that may be practically used may be on the order of hundreds—and in actual practice, less than one hundred markers may be used. This limitation arises from the difficulty in distinguishing and identifying the markers in each image, whether manually or automatically. The more numerous and densely spaced the markers, the greater the incidence of merging, occlusion and misidentification. By comparison, using an active sensing approach, the number of points that may be measured on a face may be on the order of tens of thousands. The level of geometric detail acquired by an active sensing method may be better suited to capturing the intricate structure of the human face. Furthermore, there may be no need for invasive markers.

Methods of surface measurement by active sensing may be divided into "scanning" and "snapshot" techniques. Scanning techniques involve projecting a simple light pattern such as a point or line onto an object. Due to the restricted coverage of the object by the light pattern, each image may capture only a small subset of the points on the surface. To measure the entire surface of the object, the light source may be required to be scanned over the surface and a sequence of images taken. Snapshot techniques, by contrast, involve projecting a complex light pattern, such as an orthogonal grid pattern or set of parallel stripes, over the entire object (or at least at entire aspect of the object) at once.

The scanning approach may require a significant period of time for image acquisition. For example, a laser range finder may require as much as a quarter of a minute to complete a scan of a person's head. During the scanning period, any movement of the object may lead to inconsistencies in the reconstructed surface. By contrast, the snapshot technique, due to the superior coverage of the object by the light pattern, requires very little time for image gathering—virtually only the time it takes to capture a single image. Therefore, the snapshot approach to active sensing may be used for measuring live, moving subjects.

An example of a "snapshot"-variety active-sensing surface acquisition system which may be used in the present invention includes the 3DFlash! system manufactured by 3DMetrics Inc. (Petaluma, Calif.). This system, which includes an imaging device and software programs, simultaneously acquires a set of 3-D points from the surface of an object and a photographic image of the object which is registered with the point set—which is to say, each 3-D point in the point set is matched to a 2-D point in the image, such that both were acquired from the same location on the object's surface. The system further generates a triangle mesh whose vertices are in (1-1) correspondence with the 3-D point set. The point set and triangle mesh together specify a surface model, for which the 2-D image may serve as a texture.

Using the surface acquisition system 41, the subject's face may be measured in various poses, resulting in a set of surface models, which may include the base surface model 21. The set of surface models produced by the surface acquisition system 41 is passed to surface registration unit 42, which includes devices and software programs that align all of the surface models to eliminate differences in head position. The aligned surface models are then passed finally to displacement field derivation unit 43, which includes devices and software programs used to extract the displacement fields 22 from sequences of surface models in the set.

Figure 5:
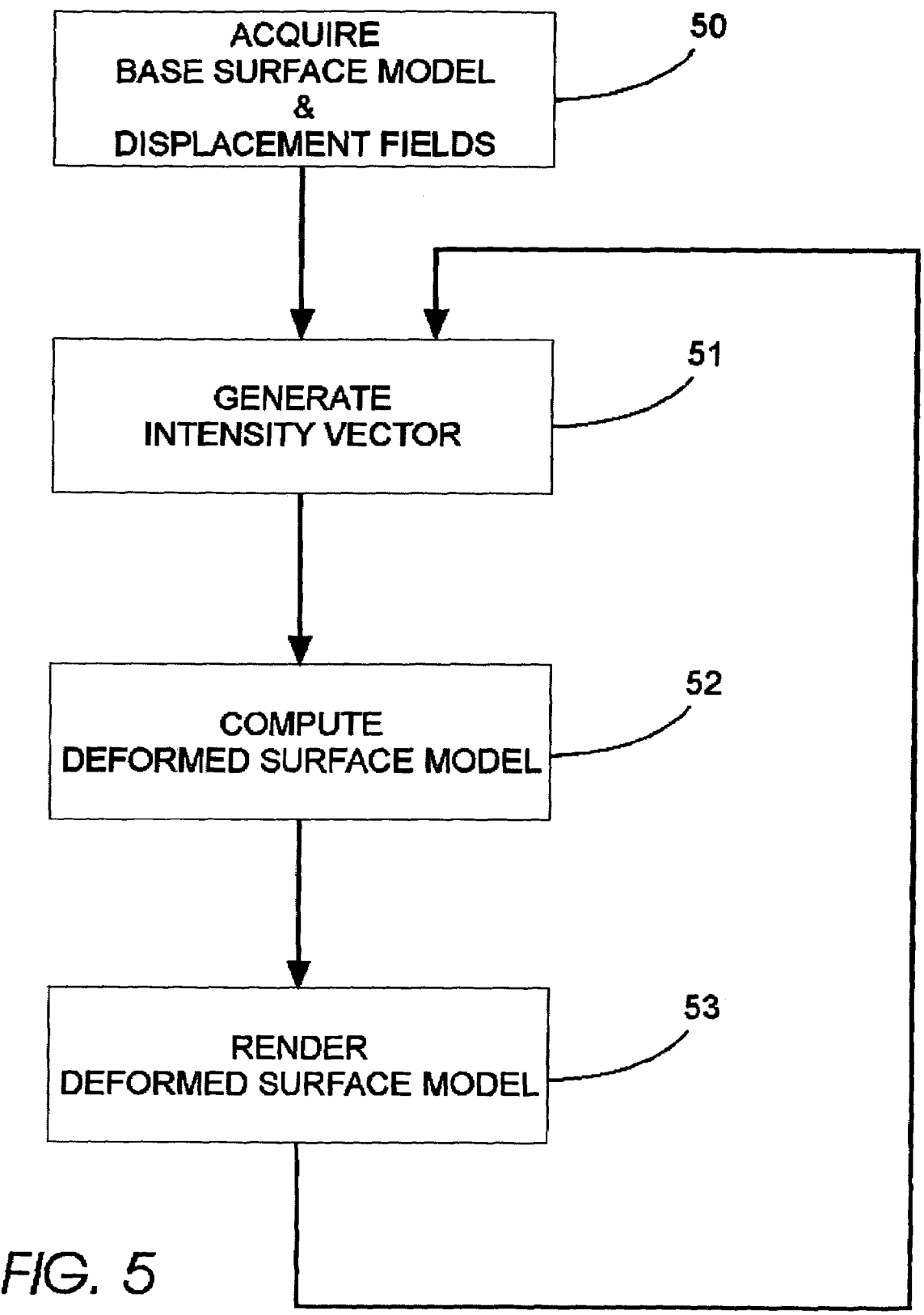
FIG. 5 illustrates a flowchart of a facial animation method according to an exemplary embodiment of the present invention.

FIG. 5 is a flowchart illustrating a facial animation method according to the present invention. At step 50, the base surface model 21 and displacement fields 22 are acquired from a live subject via facial reconstruction system 20. Step 50 is called the "facial reconstruction method." In the facial reconstruction method, the base surface model is acquired by surface measurement and reconstruction, and each displacement field is acquired by measurement and reconstruction of a displacement field on the subject's face induced by an AU. In this manner, the facial reconstruction system may provide a comprehensive 3-D reconstruction of the subject's face including both its canonical shape, represented by the base surface model, and its typical motion patterns, represented by the displacement fields. The facial reconstruction method is described in greater detail below.

In steps 51-53, a single frame of facial animation is generated. At step 51, an intensity vector $\vec{u} = (u_1, u_2, \ldots, u_N)$ is generated by the intensity generator 24. The values in $\vec{u}$ may be generated by various manners. One manner is by sampling a temporal script, in which the intensity variable for each displacement field is valuated as a function of time. Another manner is through a graphical user interface in which the user manipulates a set of objects such as virtual scales representing the intensity variables, such that the positions to which the user sets the scales determines the current intensities. Whenever one of the scales is adjusted, a new vector of intensity values is read and passed to the deformation unit. The foregoing methods of generating intensity vectors are exemplary only and the present invention may be practiced using any method of supplying intensity vectors.

At step 52, the intensity vector determined in step 51 is input to the deformation unit 25, which deforms the vertex positions of the base surface model 21 on the basis of the values in the intensity vector, as shown above. The deformation unit outputs the deformed surface model to the rendering unit 26. At step 53, the rendering unit renders the 3-D deformed surface model as a 2-D image. To do this, the rendering unit may utilize color data 23, and conventional 3-D rendering techniques. The rendered image may take the form of a bitmap. The bitmap is stored in framebuffer memory in video output subsystem 27.

The process of steps 51-53 may be repeated in an animation loop. In a separate process (not shown), the video output subsystem 27 converts the current bitmap in the framebuffer into an image on a screen, iteratively at a given screen refresh rate.

Figure 6:
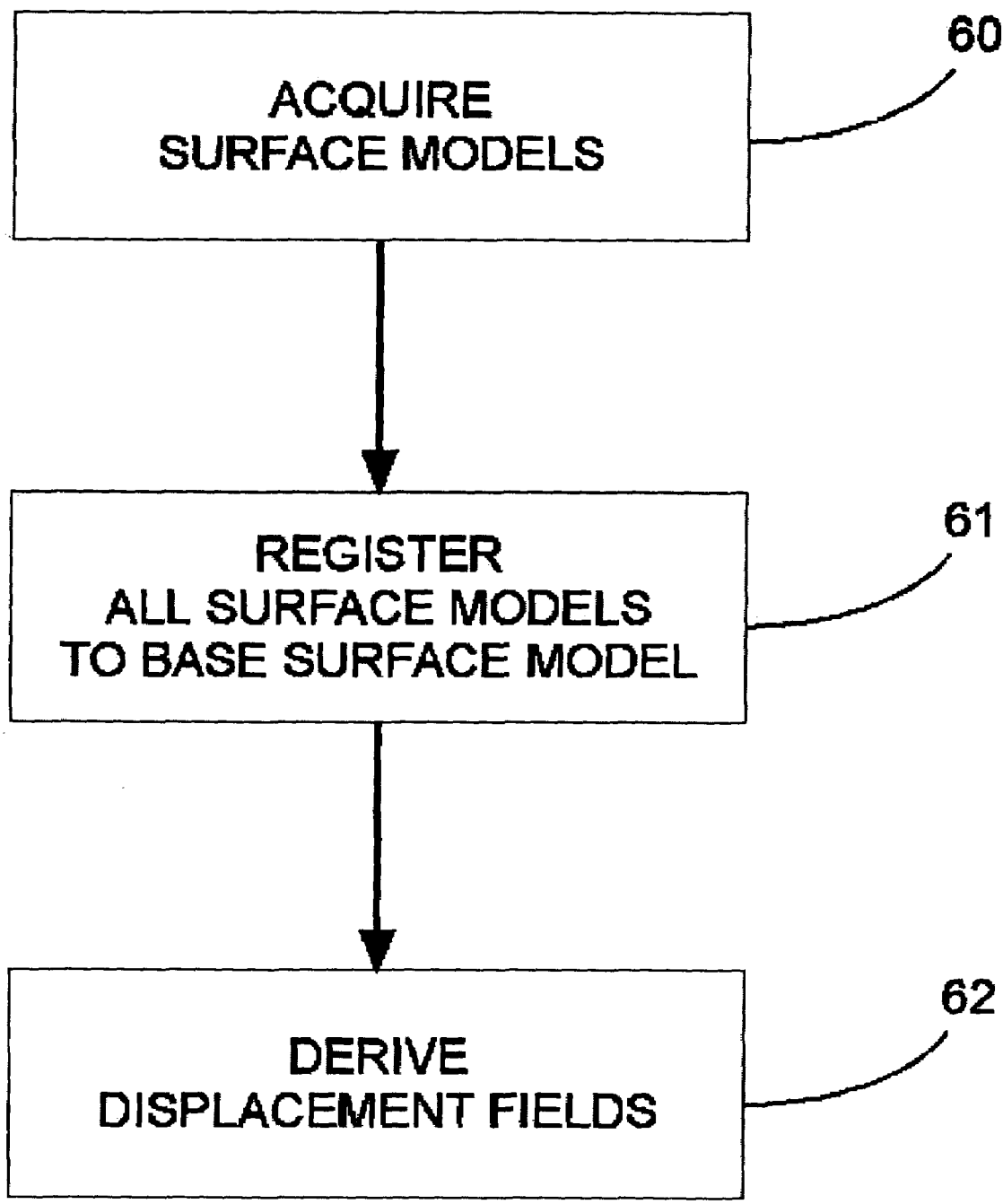
FIG. 6 illustrates a flowchart of the facial reconstruction method included in the facial animation method illustrated in FIG. 5, by which the base surface model and displacement fields are acquired from a live subject's face.

The facial reconstruction method (step 50) is shown in greater detail in FIG. 6. At step 60, the subject 40 performs a series of facial poses. Each pose has an identifying index J. (Let the identifying index of the neutral pose be 0.) During each pose J, the surface acquisition system 41 simultaneously acquires from the subject's face a set of 3-D points $P^J$ and a 2-D image or "texture" $Tex^J$ which is registered with $P^J$. On the basis of $P^J$, the surface acquisition system constructs a triangle mesh $M^J$ with vertices $V(M^J)$ in (1-1) correspondence with $P^J$. This results in a surface model $(P^J, M^J)$. On the basis of the correspondence between $P^J$ and locations in $Tex^J$, the surface acquisition system also provides a "texture map" $TexMap^J$, which maps each vertex in $V(M^J)$ to a location in the pixel grid of $Tex^J$. Using TexMap$^J$, the embedding of $M^J$ on $P^J$, $|P^J,M^J|$ may be rendered with texture $Tex^J$ providing accurate surface coloring. In sum, the series of poses performed by the subject in step 60 results in a collection of surface models $\{(P^J,M^J)\}$ approximating those poses, with associated textures and texture maps. This collection of surface models may be denoted S.

In an example embodiment of the invention, prior to the above posing and data collection, the subject's face may be marked in a certain manner. Using a high-contrast, non-toxic pen such as eyeliner, lines may be drawn on the face dividing it into featurally based regions. An exemplary set of facial regions is depicted on the faces illustrated in FIG. 1. As illustrated in the figure, the delineated regions may correspond to the salient features of the face, such as nose, eyes, upper lip, lower lip, philtrum, nasal-labial region, chin, etc. The lines drawn on the face are visible in the texture $Tex^J$ associated with each surface model $(P^J,M^J)$. As described below in conjunction with step 62, these markings are used to divide the triangle mesh of the surface model into patches corresponding to regions of the subject's face.

The acquisition of surface models in step 60 may have two objectives. One objective may be to acquire the base surface model. The base surface model may be a surface model acquired from the neutral pose; that is $(P^{base}, M^{base}) \equiv (P^0, M^0)$. The second objective may be to acquire surface models on the basis of which displacement fields may be measured and reconstructed.

Specifically, for each AU whose displacement field will be reconstructed, the subject may perform a series of q+1 poses, with indices $J_0, J_1, \ldots, J_q$ ($q \geq 1$). These poses may display the AU at a sequence of discrete values on the intensity range I, denoted $u_0, u_1, \ldots, u_q$, with $u_0 = 0, u_q = 1$, and $u_h < u_{h+1}$, where $u_h$ is the intensity value of the AU in pose $J_h$. These values on I may be called the "sample values" of the AU. For each pose $J_h$, the surface acquisition system 41 may reconstruct a surface model $(P^{J_h}, M^{J_h})$; these results in a sequence of surface models $(P^{J_0},M^{J_0}),(P^{J_1},M^{J_1}), \ldots, (P^{J_q},M^{J_q})$.

The goal in acquiring this sequence of surface models is to isolate the displacement effect of the AU. Therefore, the changes of shape in the sequence should reflect only the agency of the AU and not other sources of displacement. This may require in part some proficiency by the subject, including the ability to pose the target AU at each sample value without other facial muscles activating simultaneously. Such proficiency may be developed by studying the descriptions of the AU's in the above-mentioned Manual for the Facial Action Coding System, as well as the accompanying photographs and video, and by practicing the AU's in a mirror.

As an exception to preventing other AU's from activating simultaneously, it may be desirable in some cases to pose an unarticulated AU with some admixture of an articulated AU. In particular, for AU's involving mouth deformation—such as AU-18 (lip pucker), AU-12 (lip corner puller), AU-16 (lower lip depressor), or AU-24 (lip presser)—a descended jaw position may be desired to separate the lips during the pose. Separating the lips during the pose may serve to increase the surface area of the lips measurable by the surface acquisition system, and may prevent collisions between the lips which may lead to undesirable deformations of the mouth area such as compression and bulging.

However, if the jaw is allowed to be freely displaced during the successive poses of an unarticulated AU, this may cause undesired jaw displacement to be included in the sequence. To prevent this inclusion, the subject may perform each successive pose of the AU with an identical jaw position.

For precise repeatability of jaw position between poses, a jaw immobilizer may be constructed. A jaw immobilizer is an object which may be placed between the subject's teeth during a pose to enforce a certain jaw position. It may be constructed out of sil putty, which is available from dental supply companies. To construct a jaw immobilizer, one may place a ball of the sil putty in the subject's mouth between the upper and lower molars on one side of the mouth, sufficiently far back that the immobilizer will not interfere with the movement of the lips. The subject then bites down gently on the sil putty until the desired level of jaw opening is reached. The jaw immobilizer is then removed from the subject's mouth and hardened. It should bear the imprint of both upper and lower molars. During a posing session, the jaw immobilizer may be re-inserted into the subject's mouth at the exact location where it was imprinted, so that when the teeth close onto it, they lock into their original imprints. This should provide the ability to repeat jaw position with good precision. A separate jaw immobilizer may be required for each desired jaw position, with the exception of the closed position, which may be repeatable by virtue of the teeth locking together.

In addition to isolating the displacement effect of the target AU from that of other AU's, its displacement effect may also be isolated from the rigid translational movement of the subject's head. One approach to avoiding head movement in a sequence of poses of an AU may be to immobilize the subject's head. However, due to the range of possible movement of the head and the soft tissues involved, true head immobilization may be difficult to achieve. The kind of device that may be required to immobilize the head may also likely be invasive and uncomfortable.

An alternative solution may be to leave the subject's head relatively free during the posing session, and eliminate differences in head position after the poses have been reconstructed as surface models, using a 3-D registration technique. 3-D registration refers to computing a rigid transformation that brings one 3-D object into alignment with another 3-D object. An example registration procedure is described below.

At step 61, the total set of surface models S acquired in step 60, which includes both the base surface model and a sequence of surface models for each desired AU, are registered to each other to eliminate differences in head position. The base surface model may be used as the reference shape with which each of the other surface models is aligned. Registration is performed by the surface registration unit 42.

The registration technique employed in the present invention is an adaptation of the iterative closest point (ICP) algorithm by P. J. Besl and N. D. McKay, in "A method for registration of 3-D shapes", IEEE Transactions on Pattern Analysis and Machine Intelligence, vol. 14, no. 2, pp. 239-256, 1992, and includes modifications by G. Turk and M. Levoy in "Zippered polygon meshes from range images", Computer Graphics Proceedings, ACM SIGGRAPH '94, pp. 311-318, 1994.

Assume a pair of surface models $(P^A, M^A)$ and $(P^B, M^B)$ such that $(P^B, M^B)$ is to be transformed to align with $(P^A, M^A)$. The ICP algorithm finds the closest point on $|P^A, M^A|$ to each vertex position in $P^B$, and then transforms $P^B$ so as to minimize the collective distance between the point pairs. This procedure is iterated until convergence. Turk and Levoy adapt the ICP algorithm to pairs of surface models which only partially overlap. Specifically, they add two constraints to the point-matching step: disregard pairs of points which are too far apart, and disregard pairs in which either point is on a boundary of the surface model (i.e., the embedding of a boundary of the triangle mesh). These constraints help to avoid remote matching between point pairs located on parts of the surface models which do not actually overlap, which could cause the transformed surface model to be dragged out of alignment.

An example embodiment of the present invention adds a further constraint on the point-matching step, to adapt the algorithm to pairs of surface models which do not fit squarely because one of the surface models is partially deformed from the other. The goal with such a pair of surface models is to minimize the distance between the regions of the surface models that do fit squarely, while ignoring the regions which do not fit squarely on account of the deformation. The Turk and Levoy adapted ICP algorithm, which is designed to align pairs of surface models that fit together squarely, may attempt to match the non-conforming regions of the surface models as long as the point pairs are within a threshold distance from each other; however this may lead to a less-than-optimal alignment for the conforming regions. To address this problem, an example embodiment of the present invention adds the constraint that only selected vertex positions in $P^B$ are matched with the closest points on $|P^A, M^A|$. The group of vertex positions in $P^B$ to be matched may be selected manually on-screen using a mouse with a selection function such as picking or surrounding.

With this added constraint, the steps of the modified ICP algorithm are thus as follows:
1) For each selected vertex position in $P^B$, find the closest point on $|P^A, M^A|$.
2) Discard pairs of points that are too far apart.
3) Discard pairs in which either point is on a boundary of the surface model.
4) Find the rigid transformation of $P^B$ that minimizes the sum of the squares of distances between the pairs of points.
5) Repeat until convergence.

In order for the algorithm to converge on the correct transformation of $P^B$, a rough initial registration may be required. For the initial registration, the user may adjust the position of $|P^B, M^B|$ on-screen into crude alignment with $|P^A, M^A|$. In step 1, note that the closest point on $|P^A, M^A|$ need not coincide with the position of a vertex of $M^A$, but may also lie in the interior of the embedding of an edge or triangle of $M^A$. For step 2, a distance threshold is selected for discarding point pairs which are too far apart. Turk and Levoy suggest a distance threshold set to twice the spacing between vertex positions in the surface model.

The task in step 4 is to find the translation vector T and rotation R which minimize $$E = \sum_{i=1}^{n} \|A_i - (R(B_i, B_c) + T)\|^2$$

where $\{A_i \in |P^A, M^A| : 1 \leq i \leq n\}$ and $\{B_i \in P^B : 1 \leq i \leq n\}$ are the qualifying point pairs in $|P^A, M^A|$ and $P^B$, and $B_c$ is the centroid of $\{B_i\}$. E is the sum of the squared distances between point pairs after translation and rotation of $\{B_i\}$ (alternatively, mean square distance may be used). The solution to this least squares problem employed by Besl and McKay is that of B. K. P. Horn, in "Closed-form solution of absolute orientation using unit quaternions", Journal of the Optical Society of America, vol. 4, no. 4, pp. 629-642, 1987. Horn describes that T is simply $A_c - B_c$, the difference between the centroids of $\{A_i\}$ and $\{B_i\}$. The rotation R is found using a closed-form method based on unit quaternions. For details see the above-mentioned work of Horn.

Once the optimal rotation R and translation T are found they are applied to $P^B$ and the procedure of steps 1-4 is iterated until the change in the square error (sum of the squared distances between point pairs) falls below a certain threshold reflecting the desired precision of the registration. For further details on the registration procedure, see the above-mentioned publications.

Using the above technique, step 61 registers all of the surface models in S to the base surface model $(P^{base}, M^{base})$, eliminating differences in head position.

Once differences in head position between surface models in S have been eliminated in step 61, at step 62 a displacement field may be derived from each sequence of surface models in S. Displacement fields are derived using displacement field derivation unit 43.

Given a sequence of surface models $(P^{J_0}, M^{J_0}), (P^{J_1}, M^{J_1}), \ldots, (P^{J_q}, M^{J_q})$ representing poses of an AU at sample intensity values $u_0, u_1, \ldots, u_q$, a displacement field on the vertices $V(M^{base})$ may be derived as follows. First, for each surface model $(P^{J_h}, M^{J_h})$ in the sequence, the base surface model $(P^{base}, M^{base})$ may be deformed to fit the shape of $(p^{J_h}, M^{J_h})$ without changing its connectivity. The base surface model is deformed by changing the positions of its vertices $V(M^{base})$. The deformed positions of the vertices are denoted $P^{def(J_h)} = \{\vec{p}_i^{def(J_h)}\}$. This results in a sequence of surface models $(P^{def(J_0)}, M^{base}), (P^{def(J_1)}, M^{base}), \ldots, (P^{def(J_q)}, M^{base})$, approximating the shapes of the original surface models in the sequence but having the connectivity of the base surface model. An exemplary model fitting procedure is described below.

Second, for each sample value $u_h$, the displacement of each vertex $i \in V(M^{base})$ at $u_h$, denoted $\vec{d}_i^h$, may be defined as the change in position of the vertex from its position in pose $J_0$, $\vec{p}_i^{def(J_0)}$, to its position in pose $J_h$, $\vec{p}_i^{def(J_h)}$; i.e., $$\vec{d}_i^h = \vec{p}_i^{def(J_h)} - \vec{p}_i^{def(J_0)}$$

Finally, a displacement field $\vec{d}_k$ may be derived by interpolating the displacements of the vertices at the sample values. That is, for any $i \in V(M^{base})$ and any $u \in I$, $\vec{d}_k(i, u)$ is an interpolation of the sequence of displacement vectors $\vec{d}_i^0, \vec{d}_i^1, \ldots, \vec{d}_i^q$, with the condition that at each sample value $u_h$, $\vec{d}_k(i, u_h) = \vec{d}_i^h$. For q=1 (in which the sequence being interpolated consists of only two vectors) the interpolation may be linear. For q>1, a non-linear interpolation such as a spline curve may be appropriate.

An exemplary model fitting technique is now provided. The task is to deform the base surface model ($P^{base}, M^{base}$) to fit the shape of a given surface model ($P^J, M^J$) representing pose J, by moving the vertices $V(M^{base})$ to new positions $P^{def(J)}$.

The re-positioning of the vertices may be constrained in the following way. For each vertex $i \in V(M^{base})$, if $\vec{p}_i^{base}$ approximates the position of a given material point on the subject's face in the neutral pose, then it is desirable that $\vec{p}_i^{def(J)}$ approximates the position of the same material point in pose J. In this manner, the displacement of the vertex between any pair of poses will accurately reconstruct the displacement of the material point which it represents.

Various approaches to model fitting may be conceived. The present exemplary approach is to define a surface map $\vec{m}^J: V(M^{base}) \rightarrow |P^J, M^J|$, in which each vertex of $M^{base}$ is mapped to a position in the embedding of $M^J$, which becomes the deformed position of the vertex; that is, $\vec{p}_i^{def(J)} = \vec{m}^J(i)$.

To define the surface map, some user control may be required. However, it may not be necessary for the user to specify the mapped location of each vertex individually. A sparse initial mapping provided by the user may be sufficient to provide the basis for establishing a complete mapping automatically. A number of techniques may be available for deriving a dense mapping from one surface model to another from a sparse initial mapping. For an overview, see F. Lazarus and A. Verroust, "Three-dimensional metamorphosis: a survey", The Visual Computer, vol. 14, no. 4, pp. 373-389, 1998. The initial mapping generally involves matching common features between the two surface models.

In an example embodiment of the present invention, the surface map $\vec{m}^J$ from the vertices of $M^{base}$ to the embedding of $M^J$ is derived on the basis of an initial (1-1) correspondence between patches of $M^{base}$ to patches of $M^J$—where a "patch" of a triangle mesh, as defined above, is a sub-mesh with exactly one boundary. A mapping of the vertices of $M^{base}$ is then derived by mapping the vertices of each patch of $M^{base}$ to the embedding of the corresponding patch of $M^J$.

In order to facilitate correct re-positioning of the vertices of $M^{base}$, it may be desirable for any pair of corresponding patches of $M^{base}$ and $M^J$ to be such that their embeddings approximate the configuration of the same region of the subject's face in different poses. In this manner, vertices of $M^{base}$ associated with a given region of the subject's face may be associated with the same region after mapping. Hence, a method may be required to define a set of patches in each mesh corresponding to the same set of regions of the subject's face.

Let ($P^I, M^I$) be an exemplary surface model in S, such that patches are to be defined in $M^I$ corresponding to a certain set of regions of the subject's face. Recall that, as noted above in conjunction with step 60, a network of lines may be drawn on the subject's face prior to the acquisition of surface models, dividing the face into featurally based regions. (An exemplary network of lines is illustrated on the faces in FIG. 1.) These drawn lines appear in the texture $Tex^I$ associated with ($P^I, M^I$). Using $TexMap^I$ and a standard texture mapping procedure, the embedding $|(P^I, M^I)|$ may be rendered with the coloration of the subject's skin in $Tex^I$ accurately imposed. This means that the lines drawn on the subject's skin are actually embedded in $|(P^I, M^I)|$. In order to define the boundaries of patches in $M^I$, this network of embedded lines may be approximated by vertices and edges in $M^I$.

Figure 7A:
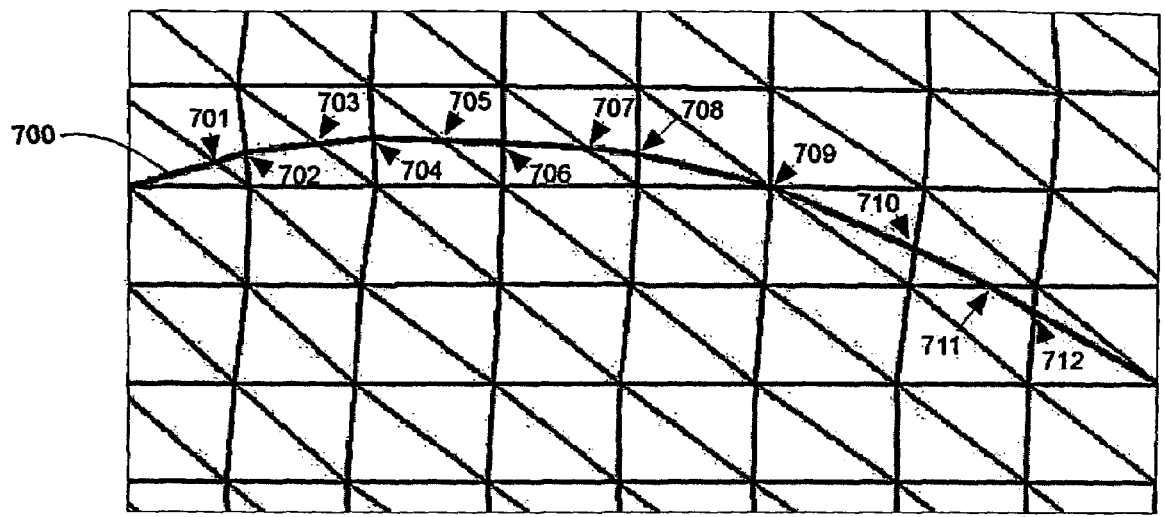
FIG. 7a illustrates a line drawn on the subject's face embedded in a surface model.

An exemplary method of approximating the embedded line network in $M^I$ is as follows. First, for each point where the embedded line network crosses the embedding of an edge of $E(M^I)$, that point may be may be added to $P^I$ as a new vertex position. FIG. 7a schematically illustrates a section of the line network 700 embedded in $|(P^I, M^I)|$. In this example, a new vertex position in $P^I$ would be established at each point where the embedded line network crosses the embedding of an edge, including points 701, 702, 703, 704, 705, 706, 707, 708, 710, 711 and 712. A new vertex position need not be added where the line network crosses an edge very close to an existing vertex position, e.g. at 709.

Figure 8B:
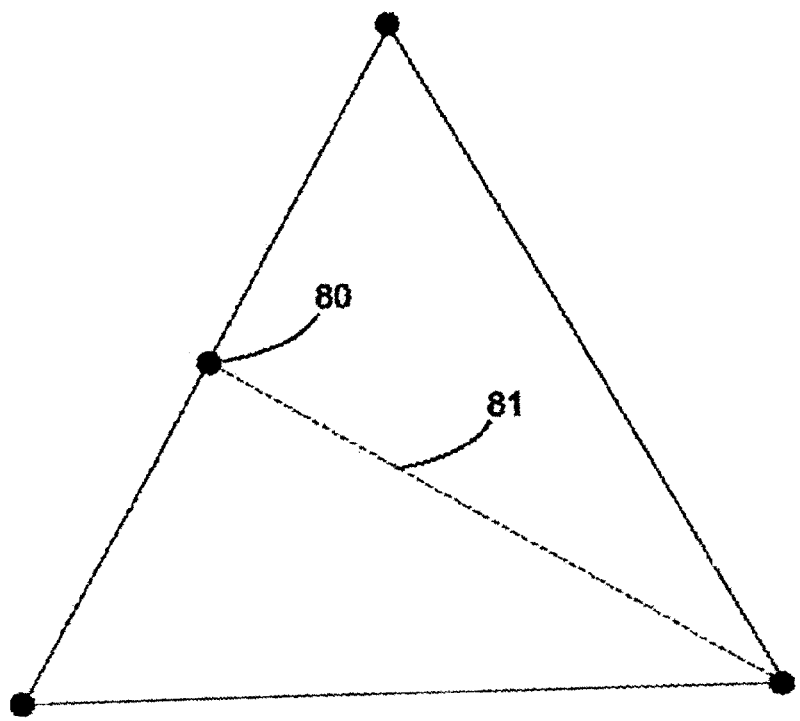
FIG. 8b illustrates how a triangle with two edges divided by new vertices may be subdivided.
Figure 8A:
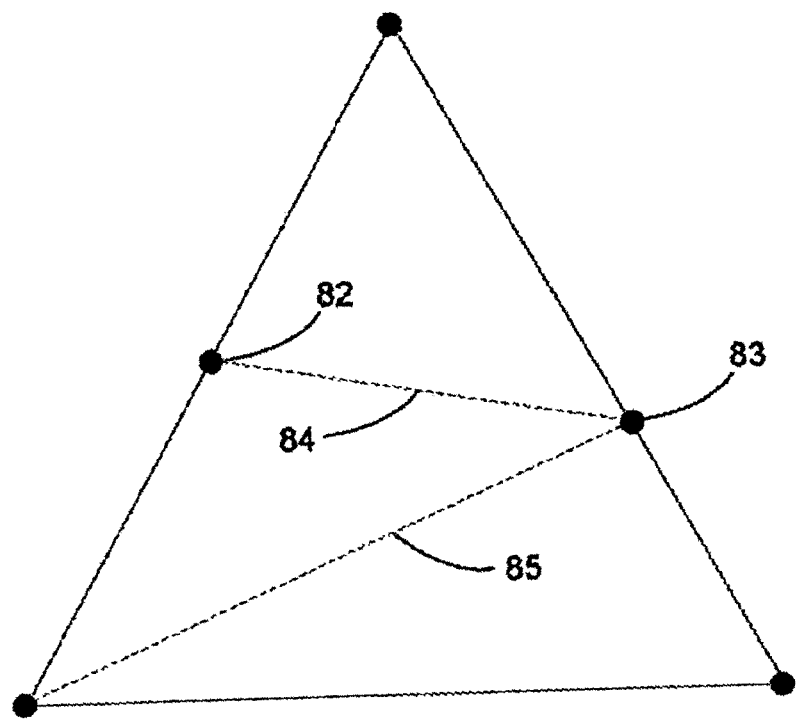
FIG. 8a illustrates how a triangle with one edge divided by a new vertex may be subdivided.

Once new vertex positions are established along the embedded line network, the triangle mesh $M^I$ may be modified to incorporate vertices corresponding to the new vertex positions, as well as edges and triangles to connect those vertices. First, for each new vertex position $\vec{p}_i^I \in P^I$, a corresponding vertex i may be added to $V(M^I)$. Then, for each edge $\{j,k\} \in E(M^I)$ whose embedding $\vec{p}_j^I \vec{p}_k^I$ contains a new vertex position $\vec{p}_i^I$—i.e., $\vec{p}_i^I \in \vec{p}_j^I \vec{p}_k^I$—the edge $\{j,k\}$ may be divided into the two new edges $\{j,i\}$ and $\{i,k\}$, which replace $\{j,k\}$ in $E(M^I)$. And finally, triangles containing edges that have been thus divided may be replaced to accommodate the division of their edges. For example, FIG. 8a illustrates a triangle with one edge divided by a new vertex 80. A new edge 81 may be added to form two new triangles, which replace the original triangle in $T(M^I)$. FIG. 8b illustrates a triangle with two divided edges. Two new edges may be added to form three new triangles. One edge 84 may be added between the two new vertices 82 and 83, and another edge 85 may be added between one of the new vertices and the vertex to which it is not already connected. (This means there are two possibilities for the second new edge. The choice between them may be based on the comparative quality of the resulting triangulation, where thinner triangles are of lower quality.)

Figure 7B:
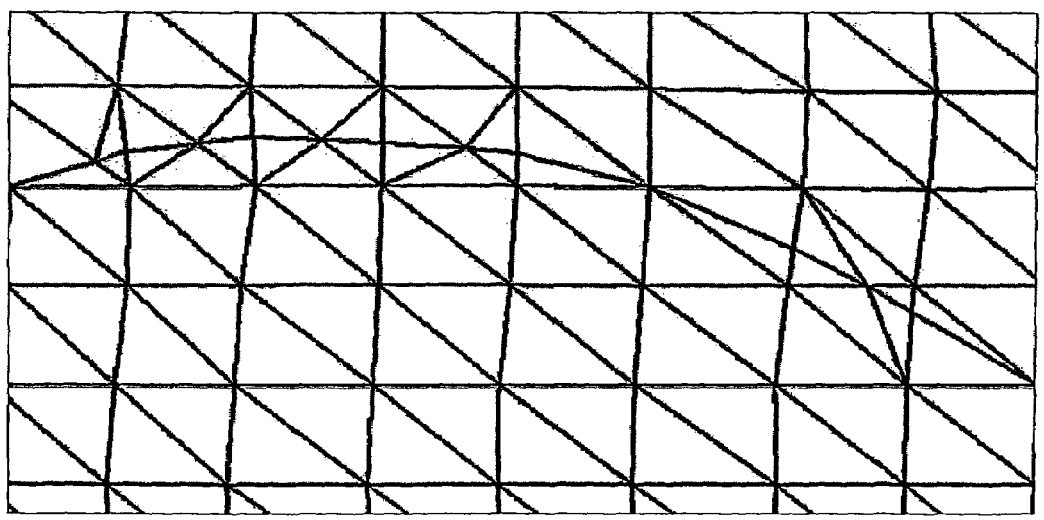

FIG. 7b illustrates the net result of adding points to $P^I$ and modifying the sets of vertices, edges and triangles in $M^I$ to approximate the line shown embedded in $|(P^I, M^I)|$ in FIG. 7a.

Once the line network is approximated in $M^I$, the boundary of each patch of $M^I$ may be identified as a cycle in $M^I$ which approximates a loop in the embedded line network, and each patch itself may be identified as the set of vertices, edges and triangles included in or enclosed by a patch boundary. The union of the patch boundaries of $M^I$ forms a connected graph in $M^I$ called the "boundary graph" of $M^I$, denoted $BG^I$. The boundary graph approximates the entire embedded line network.

The vertices of $M^I$, $V(M^I)$, may be classified as follows. If a vertex i is included in the boundary graph $BG^I$—that is, $i \in V(BG^I)$—it is called a "boundary vertex." If a vertex i is included in a patch of $M^I$ but not in the boundary graph, it is called an "interior vertex." A special case of a boundary vertex is a "node vertex," which is defined as a boundary vertex that is included in three or more edges of $E(BG^I)$. The node vertices are the branching points of $BG^I$. A boundary vertex which is not a node vertex is called a non-node boundary vertex.

Figure 9:
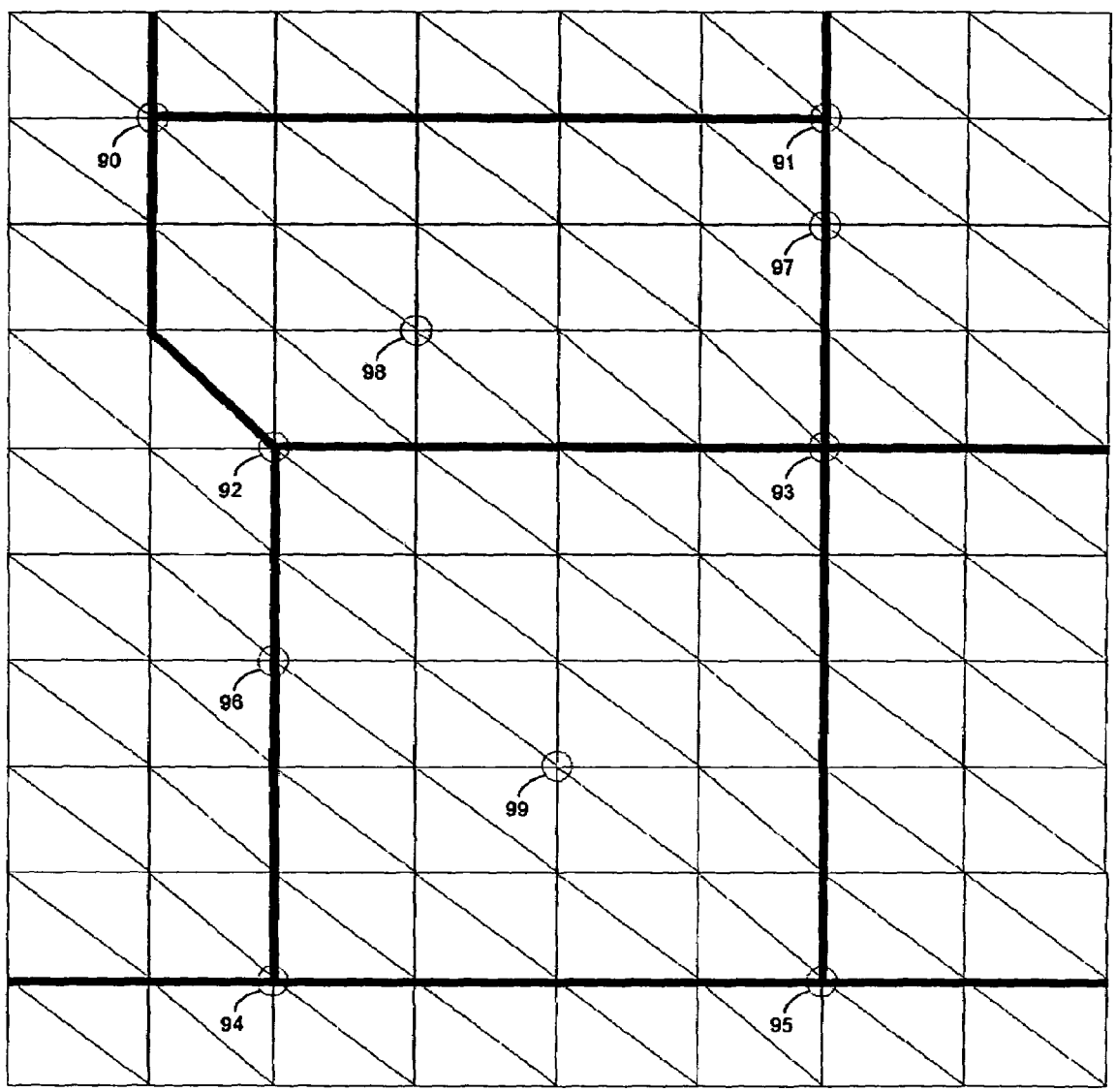
FIG. 9 illustrates a portion of a schematic triangle mesh with patch boundaries indicated by bolder lines, illustrating examples of the three types of vertices (node, non-node boundary and interior).

FIG. 9 illustrates a portion of a schematic triangle mesh with patch boundaries indicated by bolder lines, with examples of the three types of vertices. There are six node vertices visible in the figure, labeled 90, 91, 92, 93, 94 and 95. Also indicated are examples of non-node boundary vertices 96 and 97, and interior vertices 98 and 99.

A "boundary segment" of $M^I$ is defined as a path in $BG^I$ containing exactly 2 node vertices, which are the terminal vertices of the path. For example, in FIG. 9, exemplary boundary segments lie between the pairs of node vertices 90, 91; 90, 92; 91, 93; 92, 93; 92, 94; 93, 95; and 94, 95.

Let the sets of node vertices, non-node boundary vertices and interior vertices of $M^I$ be denoted NVERTS($M^I$), BVERTS($M^I$) and IVERTS($M^I$), respectively. Let the set of patches of $M^I$ be denoted PATCHES($M^I$) and the set of boundary segments of $M^I$ be denoted BSEGS($M^I$).

Returning to the initial correspondence between $M^{base}$ and $M^J$, the requirements for that correspondence may now be stated as follows.

1) there exists a (1-1) correspondence f: PATCHES($M^{base}$)→PATCHES($M^J$);

2) there exists a (1-1) correspondence g: NVERTS($M^{base}$)→NVERTS($M^J$) such that for any patch $\pi \in$ PATCHES($M^{base}$) and any node vertex $i \in$ NVERTS($M^{base}$), if $i \in \pi$, then g(i)∈f($\pi$);

3) there exists a (1-1) mapping h: BSEGS($M^{base}$)→BSEGS($M^J$) such that for any patch $\pi \in$ PATCHES($M^{base}$) and any boundary segment $\beta \in$ BSEGS($M^{base}$), if $\beta \subset \pi$, then h($\beta$)∈f($\pi$).

On the basis of these correspondences, the mapping $\vec{m}^J$: V($M^{base}$)→|$P^J,M^J$| from the vertices of $M^{base}$ to the embedding of $M^J$ may be generated. The vertices may be mapped first to the topological elements of $M^J$, by defining these three mappings:

i) nmap$^J$: NVERTS($M^{base}$)→V($M^J$)

ii) bmap$^J$: BVERTS($M^{base}$)→E($M^J$)×$\Re^2$ iii) imap$^J$: IVERTS($M^{base}$)→T($M^J$)×$\Re^3$.

nmap$^J$ maps each node vertex $i \in$ NVERTS($M^{base}$) to a vertex of $M^J$. bmap$^J$ maps each non-node boundary vertex $i \in$ BVERTS($M^{base}$) to a pair ({a,b},($\lambda_a,\lambda_b$)), where {a,b} is an edge in $M^J$ and ($\lambda_a,\lambda_b$) is a 2-D barycentric coordinate with $\lambda_a+\lambda_b=1$. imap$^J$ maps each interior vertex $i \in$ IVERTS($M^{base}$) to a pair ({a,b,c},($\lambda_a,\lambda_b,\lambda_c$)), where {a,b,c} is a triangle in $M^J$ and ($\lambda_a,\lambda_b,\lambda_c$) is a 3-D barycentric coordinate with $\lambda_a+\lambda_b+\lambda_c=1$.

For nmap$^J$, each node vertex $i \in$ NVERTS($M^{base}$) may be simply mapped to the corresponding node vertex in NVERTS($M^J$); that is, nmap$^J$(i)=f(i).

For bmap$^J$, the non-node boundary vertices BVERTS($M^{base}$) may be mapped on the basis of the (1-1) mapping g from boundary segments of $M^{base}$ to boundary segments of $M^J$. For each pair of corresponding boundary segments $\beta \in$ BSEGS($M^{base}$) and $\chi \in$ BSEGS($M^J$) such that g($\beta$)=$\chi$, each vertex $i \in$ V($\beta$) may be mapped to a pair ({a,b},($\lambda_a,\lambda_b$)), where {a,b} is an edge in E($\chi$).

To determine the mapping of the non-node boundary vertices of $\beta$ to edges of $\chi$, both $\beta$ and $\chi$ may be embedded in the unit interval [0,1], by a pair of mappings $z^\beta$: V($\beta$)→[0,1] and $z^\chi$: V($\chi$)→[0,1]. $z^\beta$ and $z^\chi$ may be determined as follows. The two node vertices of each boundary segment may be mapped to the endpoints of the interval, 0 and 1, with corresponding node vertices of $\beta$ and $\chi$ being mapped to the same endpoint. The remaining vertices of each boundary segment may be mapped to the interior of the interval. To minimize metric distortion, the vertices of each boundary segment may be mapped so that for each edge in the boundary segment, the ratio between the length of the edge and the length of the boundary segment is the same in [0,1] as it is in the original embedding of the boundary segment.

Once the vertices of the two boundary segments have thus been mapped to [0,1], the vertices of $\beta$ may be mapped to edges of $\chi$. Specifically, for each non-node boundary vertex $i \in$ V($\beta$), $$bmap^J(i)=(\{a,b\},(\lambda_a,\lambda_b))\ (\lambda_a+\lambda_b=1),$$

where {a,b} is an edge in $\chi$ containing i—that is, $z^\beta(i) \in [z^\chi(a),z^\chi(b)]$—and $$\lambda_a = \frac{z^\beta(i) - z^\chi(b)}{z^\chi(a) - z^\chi(b)}.$$

The value of $\lambda_b$ is the unit complement, $\lambda_b=1-\lambda_a$.

Finally, to determine imap$^J$, the interior vertices IVERTS($M^I$) may be mapped on the basis of the (1-1) mapping h from the patches of $M^{base}$ to the patches of $M^J$. For each pair of corresponding patches $\pi \in$ PATCHES($M^{base}$) and $\sigma \in$ PATCHES($M^J$) such that h($\pi$)=$\sigma$, each vertex $i \in$ V($\pi$) may be mapped to a pair ({a,b,c},($\lambda_a,\lambda_b,\lambda_c$)), where {a,b,c} is a triangle of T($M^J$).

To determine the mapping of the interior vertices of $\pi$ to triangles of $\sigma$, both $\pi$ and $\sigma$ may be embedded in the unit disk D in $\Re^2$, by a pair of mappings $\vec{w}^\pi$: V($\pi$)→D and $\vec{w}^\sigma$: V($\sigma$)→D. The vertices of patch $\sigma$ may be mapped to D first, to be followed by those of $\pi$; i.e., we first define $\vec{w}^\sigma$.

To map the vertices of $\sigma$ to D, a first step may be to map the vertices in $\partial\sigma$ (the boundary of $\sigma$) to the boundary of D. To minimize distortion, this mapping may be such that for each edge of E($\partial\sigma$), the ratio between the length of the edge and the total length of $\partial\sigma$ is the same in D as in the original embedding of $\partial\sigma$, |$P^J,\partial\sigma$|

Next the interior vertices of the patch $\sigma$ may be mapped to D, for example through a harmonic mapping technique adapted from M. Eck et al., "Multiresolution analysis of arbitrary meshes," in Proceedings of ACM SIGGRAPH '93, ACM Press, pp. 27-34, 1993. This technique maps the interior vertices of $\sigma$ to D in a manner that minimizes metric distortion relative to the original embedding of $\sigma$, |$P^J,\sigma$|. The positions of the interior vertices of $\sigma$ in D are calculated to minimize a total energy function E. E may be the sum of the elastic energy of springs placed along the edges of $\sigma$:

$$E = \tfrac{1}{2}\Sigma_{\{a,b\}\in E(\sigma)} \kappa_{\{a,b\}} \|\vec{w}^\sigma(a) - \vec{w}^\sigma(b)\|^2$$

where $\vec{w}^\sigma$ is fixed for the vertices of $\partial\sigma$, whose mapping has already been determined. $\kappa_{\{a,b\}}$ is a spring constant for edge {a,b} and is calculated as follows. For each edge $\{a,b\} \in \sigma$, let $L_{\{a,b\}}$ denote its original length $L_{\{a,b\}} = \|\vec{p}_a^J - \vec{p}_b^J\|$. For each triangle $\{a,b,c\} \in \sigma$, let $A_{\{a,b,c\}}$ denote its original area, i.e., the area of $\vec{p}_a^J \vec{p}_b^J \vec{p}_c^J$. For each edge {a,b} included in two triangles $\{a,b,c_1\}$, $\{a,b,c_2\}$ $$\kappa_{\{a,b\}} = \frac{(L_{\{a,c_1\}}^2 + L_{\{b,c_1\}}^2 + L_{\{a,b\}}^2)}{A_{\{a,b,c_1\}}} + \frac{(L_{\{a,c_2\}}^2 + L_{\{b,c_2\}}^2 + L_{\{a,b\}}^2)}{A_{\{a,b,c_2\}}}$$

By virtue of this formula, the stiffness of the spring along edge {a,b} is greater the shorter the edge is in proportion to the other edges of its two adjacent triangles, and the smaller the triangles themselves are in area. This has the net result of minimizing metric distortion, i.e., the stretching of regions of small diameter. For edges included in only one triangle (edges on a boundary of $M^J$), the formula reduces to one term. A unique minimum for E may be found by solving a sparse linear least-squares problem. A solution is described by T. Kanai et al., "Three-dimensional geometric metamorphosis based on harmonic maps", The Visual Computer, vol. 14, no. 4, pp. 166-176, 1998.

FIG. 10 illustrates an original embedding of an exemplary patch of a triangle mesh (corresponding to a nose), and its embedding in D using the example technique just described.

After mapping the vertices of σ to D, the vertices of the corresponding patch of $M^{base}$, π, may be mapped to D; that is, $\vec{w}^\pi$ may be defined. To map the vertices of π to D, the first step may be to map the vertices of ∂π. The vertices of a may be mapped to the embedding of ∂σ in D, based on their barycentric coordinates already determined. That is, for each vertex i∈∂π with bmap$^J$(i)=({a,b},$\lambda_a$,$\lambda_b$)

$$\vec{w}^\pi(i) = \lambda_a \vec{w}^\sigma(a) + \lambda_b \vec{w}^\sigma(b).$$

Once the vertices of ∂π are thus mapped to D, the interior vertices of π may be mapped to D by harmonic mapping; that is, by minimizing $$E = \tfrac{1}{2} \Sigma_{\{i,j\} \in E(\pi)} \kappa_{\{i,j\}} \| \vec{w}^\pi(i) - \vec{w}^\pi(j) \|^2$$

where $\vec{w}^\pi$ is fixed for the vertices of ∂π and $\kappa_{\{i,j\}}$ is calculated as above.

Now that all of the vertices of both σ and π have been mapped to D, the vertices of π may be mapped to triangles of σ. Specifically, for each interior vertex i∈V(π), $$imap^J(i) = (\{a,b,c\}, (\lambda_a, \lambda_b, \lambda_c)) \ (\lambda_a + \lambda_b + \lambda_c = 1)$$

where {a,b,c} is a triangle of σ to which i is incident in D—that is, $\vec{w}^\pi(i)$ is included in triangle $\vec{w}^\sigma(a) \vec{w}^\sigma(b) \vec{w}^\sigma(b)$—and where $\lambda_a$, $\lambda_b$ and $\lambda_c$ are the barycentric coordinates of $\vec{w}^\pi(i)$ relative to the points $\vec{w}^\sigma(a)$, $\vec{w}^\sigma(b)$ and $\vec{w}^\sigma(c)$.

After having defined the mappings nmap$^J$, bmap$^J$ and imap$^J$ as described above, the surface map $\vec{m}^J$: V($M^{base}$) →|P$^J$,M$^J$| may be derived as follows:

1) for each node vertex i∈NVERTS($M^{base}$) with nmap$^J$(i)=a, $\vec{m}^J(i) = \vec{p}_a^J$;

2) for each non-node boundary vertex i∈BVERTS($M^{base}$) with bmap$^J$(i)=({a,b},($\lambda_a$,$\lambda_b$)), $\vec{m}^J(i) = \lambda_a \vec{p}_a^J + \lambda_b \vec{p}_b^J$;

3) for each interior vertex i∈IVERTS($M^{base}$) with imap$^J$(i)=({a,b,c},($\lambda_a$,$\lambda_b$,$\lambda_c$)), $\vec{m}^J(i) = \lambda_a \vec{p}_a^J + \lambda_b \vec{p}_b^J + \lambda_c \vec{p}_c^J$.

For vertices of V($M^{base}$) which are not included in any patch of $M^{base}$, and therefore do not fall in the domain of either nmap$^J$, bmap$^J$ or imap$^J$, the value of $\vec{m}^J$ may be undefined.

Given $\vec{m}^J$, the fitting of the base surface model (P$^{base}$, $M^{base}$) to the surface model (P$^J$,M$^J$), expressed as a set of deformed vertex positions p$^{def(J)}$, may be determined as follows. For each vertex i∈V($M^{base}$), if $\vec{m}^J(i)$ is defined, $\vec{p}_i^{def(J)} = \vec{m}^J(i)$. If $\vec{m}^J(i)$ is undefined, in the absence of some other fitting mechanism, the vertex may remain in its original position, i.e., $\vec{p}_i^{def(J)} = \vec{p}_i^{base}$.

Alternative approaches to model fitting than the surface mapping procedure described above may be contemplated. In one alternative approach, p$^{def(J)}$ may be produced using a particular displacement field $\vec{d}_k$ that has already been derived. P$^{def(J)}$ results from applying $\vec{d}_k$ to the vertex positions P$^{base}$, such that $\vec{p}_i^{def(J)} = \vec{p}_i^{base} + \vec{d}_k(i,u)$. The task is to find an intensity value u such that the collective distance between P$^{def(J)}$ and |P$^J$,M$^J$| is minimized.

This alternative method of model fitting may be suitable in particular for fitting the base surface model to a surface model (P$^J$,M$^J$) whose pose J differs from that of the base surface model (the neutral pose) only in jaw position. For example, let J differ from the neutral pose only in having an elevated intensity for jaw descender (AU-27). In such a case, if the displacement field for this AU has already been acquired, then that displacement field may be applied to the base surface model to approximate the jaw position evident in (P$^J$,M$^J$), resulting in a fitting of the base surface model to (P$^J$,M$^J$).

This concludes the facial reconstruction method represented in FIG. 6, by which the base surface model 21 and displacement fields 22 of the facial animation system are acquired from a live subject. Note that the base surface model may be provided in its final form in step 62, after P$^{base}$ and $M^{base}$ have been edited to approximate the embedded line network. The triangle mesh of the base surface model, $M^{base}$, may be very dense (containing many triangles), since the surface acquisition system 41 may perform its measurements at high resolution. However, the large number of triangles in the triangle mesh may cause slow rendering times on some computer systems, preventing real time animation using an implementation of the facial animation system. Many approaches to triangle mesh simplification may be available in the public domain. Such an approach may involve decimation of the vertices of the triangle mesh, with subsequent editing of the edges and triangles. After decimation of the vertices, the displacement fields 22 may still apply to the remaining vertices.

What is claimed is:

1. A system for animating a face, comprising:
a surface acquisition arrangement for acquiring a set of three-dimensional surface models that approximate a shape of a subject's face in different poses, the surface models including a base surface model that includes a set of control points which have default position vectors, the surface models further including at least one sequence of surface models such that the surface models in a given sequence approximate the shape of the subject's face at successive phases of a particular one of muscle movement and facial expression, and for acquiring a set of displacement fields representing motion patterns of the subject's face such that each displacement field generates a three-dimensional displacement vector that varies over the control points of the base surface model and over an intensity variable;
a displacement field derivation unit configured to derive one of the displacement fields from one of the sequences of surface models by mapping the control points of the base surface model to positions in the surface of each of the surface models in the sequence, and by calculating a displacement of each control point from its mapped position in the first surface model in the sequence to its mapped position in each of the other surface models in the sequence;

a storage arrangement for storing the set of surface models and the set of displacement fields;

an intensity generator to generate a current intensity value for each displacement field in the set of displacement fields;

a deformation unit to combine the displacement vectors generated by the displacement fields at the control points and at the current intensity values with the default position vectors of the control points to generate a deformed surface model;

a rendering unit to translate the deformed surface model into a two-dimensional image of the face; and a video output subsystem to at least one of display and store the two-dimensional image.

2. The system of claim 1, wherein the base surface model represents a shape of the face in a neutral, relaxed pose.

3. The system of claim 1, wherein each of the surface models of the set of surface models acquired from the subject's face includes:

a set of three-dimensional points measured from the subject's face;

a topological model representing a set of vertices and connections between them; and an association between the set of three-dimensional points and the vertices which determines an embedding of the topological model in three-dimensional space.

4. The system of claim 1, wherein the surface acquisition arrangement includes an active sensing arrangement for surface measurement.

5. The system of claim 4, wherein the active sensing arrangement projects a grid pattern for surface measurement.

6. The system of claim 4, wherein the active sensing arrangement projects a pattern of multiple parallel stripes for surface measurement.

7. The system of claim 1, wherein one of the sequences of surface models is associated to a sequence corresponding intensity values, each intensity value representing a degree of muscle contraction for the particular one of muscle movement and expression corresponding to the sequence of surface models.

8. The system of claim 7, wherein the displacement field derivation unit is configured to:

re-position the control points of the base surface model to fit the shape of each particular surface model in one of the sequences of surface models to produce a sequence of deformed surface models approximating the original sequence of surface models but having the control points of the base surface model;

calculate the displacements of the control points of the base surface model at each particular intensity value in the sequence of intensity values, by calculating the displacement of each control point from its position in the deformed surface model associated with the first intensity value in the sequence of intensity values to a position in the deformed surface model associated with the particular intensity value; and derive the displacement field by determining the displacements of the control points of the base surface model at intensity values intermediate to the intensity values in the sequence of intensity values, by interpolating between the displacements at the intensity values in the sequence of intensity values.

9. The system of claim 1, further including a surface registration unit to geometrically align the surface models to minimize differences in head position.

10. The system of claim 9, wherein the surface registration unit applies an iterative closest point technique to geometrically align the surface models.

11. The system of claim 1, wherein the current intensity values for the displacement fields are sampled from a set of time-varying functions.

12. The system of claim 1, wherein the current intensity values for the displacement fields are manually input.

13. The system of claim 1, wherein the current intensity values for the displacement fields are supplied by a speech animation program.

14. The system of claim 1, wherein the deformation unit combines the position vector at each control point of the base surface model with the displacement vectors generated by the displacement fields at that control point by vector sum.

15. The system of claim 1, wherein the rendering unit translates the deformed surface model into the two-dimensional image using color values associated with the base surface model.

16. The system of claim 1, wherein the two-dimensional image includes a bit map.

17. The system of claim 1, wherein the surface acquisition arrangement further includes a jaw immobilizer to minimize differences in the position of the subject's jaw at different phases of a particular muscle movement.

18. A system for animating a face, comprising:

a facial reconstruction arrangement for acquiring a base surface model representing a three-dimensional shape of a subject's face, and for acquiring a set of displacement fields representing motion patterns of the subject's face, wherein the base surface model includes a set of control points and each displacement field generates a three-dimensional displacement vector that varies over the control points and over an intensity variable;

an intensity generator to generate a current intensity value for each displacement field in the set of displacement fields;

a deformation unit to combine the displacement vectors generated by the displacement fields at the control points and at the current intensity values with the positions of the control points to generate a deformed surface model;

a rendering unit to translate the deformed surface model into a two-dimensional image of the face; and a video output subsystem to at least one of display and store the two-dimensional image, wherein the facial reconstruction arrangement includes a surface acquisition arrangement for acquiring a set of surface models that approximate shapes of the subject's face, and a storage arrangement for storing the set of acquired surface models, wherein the surface acquisition arrangement acquires a sequence of surface models from a sequence of facial poses involving a particular muscle movement, wherein the facial reconstruction arrangement is configured to associate a sequence of increasing intensity values with the sequence of surface models, the intensity values representing degrees of muscle contraction for the particular muscle movement in corresponding poses in the sequence of facial poses, and wherein the facial reconstruction arrangement further includes a jaw immobilizer to minimize differences in jaw position during different poses in the sequence of facial poses involving the particular muscle movement.

19. A system for animating a face, comprising:
a facial reconstruction arrangement for acquiring a base surface model representing a three-dimensional shape of a subject's face, and for acquiring a set of displacement fields representing motion patterns of the subject's face, wherein the base surface model includes a set of control points and each displacement field generates a three-dimensional displacement vector that varies over the control points and over an intensity variable;
an intensity generator to generate a current intensity value for each displacement field in the set of displacement fields;
a deformation unit to combine the displacement vectors generated by the displacement fields at the control points and at the current intensity values with the positions of the control points to generate a deformed surface model;
a rendering unit to translate the deformed surface model into a two-dimensional image of the face; and
a video output subsystem to at least one of display and store the two-dimensional image,
wherein the facial reconstruction arrangement includes a surface acquisition arrangement for acquiring a set of surface models that approximate shapes of the subject's face, and a storage arrangement for storing the set of acquired surface models,
wherein the surface acquisition arrangement acquires a sequence of surface models from a sequence of facial poses involving a particular muscle movement,
wherein the facial reconstruction arrangement is configured to associate a sequence of increasing intensity values with the sequence of surface models, the intensity values representing degrees of muscle contraction for the particular muscle movement in corresponding poses in the sequence of facial poses,
wherein the facial reconstruction arrangement further includes a displacement field derivation unit to derive one of the displacement fields in the set of displacement fields from the sequence of surface models, and
wherein the displacement field derivation unit is configured to:
re-position the control points of the base surface model to fit the shape of each particular surface model in the sequence of surface models to produce a sequence of deformed surface models approximating the original sequence of surface models but having the control points of the base surface model;
calculate the displacements of the control points of the base surface model at each particular intensity value in the sequence of intensity values, by calculating the displacement of each control point from its position in the deformed surface model associated with the first intensity value in the sequence of intensity values to a position in the deformed surface model associated with the particular intensity value; and
derive the displacement field by determining the displacements of the control points of the base surface model at intensity values intermediate to the intensity values in the sequence of intensity values, by interpolating between the displacements at the intensity values in the sequence of intensity values.

20. The system of claim 19, wherein the displacement field derivation unit performs a linear interpolation of the displacements at the intensity values in the sequence of intensity values.

21. The system of claim 19, wherein the displacement field derivation unit performs a non-linear interpolation of the displacements at the intensity values in the sequence of intensity values.

22. The system of claim 19, wherein the displacement field derivation unit maps the control points to positions in the surface of the particular surface model.

23. The system of claim 19, wherein the displacement field derivation unit maps regions of the surface of the base surface model to corresponding regions of the surface of the particular surface model.

24. The system of claim 23, wherein the surface acquisition arrangement acquires a photographic image of the subject's face at the same time as it performs the three-dimensional measurements used to make a surface model in the set of surface models, and wherein the surface acquisition arrangement associates the photographic image with the surface model as a texture, and wherein the displacement field derivation unit maps regions of the surface of a surface model to corresponding regions of the surface of another surface model using the textures of the two surface models.

25. The system of claim 24, wherein the displacement field derivation unit uses a network of lines that are drawn on the subject's face and appear in the texture of each surface model in the set of surface models to map regions of the surface of a surface model to corresponding regions of a surface of another surface model.

26. A method for animating a face, comprising:
acquiring a base surface model representing a three-dimensional shape of the face and including a set of control points which have default position vectors;
acquiring a set of three-dimensional surface models approximating a shape of a subject's face in different poses, the set including at least one sequence of surface models such that the surface models in a given sequence approximate the shape of the subject's face at successive phases of a particular one of muscle movement and expression;
mapping the control points of the base surface model to positions in at least one surface of the other surface models;
for each sequence of surface models, calculating a displacement of each control point from its mapped position in the first surface model in the sequence to its mapped position in each of the other surface models in the sequence, to derive a displacement field corresponding to that sequence of surface models, which displacement field generates a three-dimensional displacement vector that varies over the control points of the base surface model and over an intensity variable;
generating a current intensity value for each displacement field;
combining the displacement vectors generated by the displacement fields at the control points and at the current intensity values with the default position vectors of the control points to generate a deformed surface model;
rendering the deformed surface model to generate a two-dimensional visual image of the face; and
displaying or storing the two-dimensional image.

27. The method of claim 26, wherein the base surface model represents a shape of the face in a neutral, relaxed pose.

28. The method of claim 26, wherein the set of surface models acquired from the subject's face includes the base surface model.

29. The method of claim 26, wherein each of the surface models acquired from the subject's face includes:
- a set of three-dimensional points measured from the subject's face;
- a topological model representing a set of vertices and connections between them; and
- an association between the set of three-dimensional points and the vertices which determines an embedding of the topological model in three-dimensional space.

30. The method of claim 26, wherein the set of surface models is acquired from the subject's face using measurement by active sensing.

31. The method of claim 30, wherein the active sensing includes projecting a grid pattern.

32. The method of claim 30, wherein the active sensing includes projecting a pattern of multiple parallel stripes.

33. The method of claim 26, wherein one of the sequences of surface models is associated to a sequence of corresponding intensity values, each intensity value representing a degree of muscle contraction for the particular one of muscle movement and expression corresponding to the sequence of surface models.

34. The method of claim 33, wherein the derivation of the displacement field comprising:
- re-positioning control points of the base surface model to fit the shape of each particular surface model in the sequence of surface models to produce a sequence of deformed surface models approximating the original sequence of surface models but having the control points of the base surface model;
- calculating the displacements of the control points of the base surface model at each particular intensity value in the sequence of intensity values, by calculating the displacement of each control point from its position in the deformed surface model associated with the first intensity value in the sequence of intensity values to its position in the deformed surface model associated with the particular intensity value; and
- deriving the displacement field by determining the displacements of the control points of the base surface model at intensity values intermediate to the intensity values in the sequence of intensity values, by interpolating between the displacements at the intensity values in the sequence of intensity values.

35. The method of claim 26, wherein the surface models are geometrically aligned to minimize differences in head position.

36. The method of claim 35, wherein the geometric alignment of the surface models includes application of an iterative closest point technique.

37. The method of claim 26, wherein the current intensity values for the displacement fields are sampled from a set of time-varying functions.

38. The method of claim 26, wherein the current intensity values for the displacement fields are manually input.

39. The method of claim 26, wherein the current intensity values for the displacement fields are supplied by a speech animation program.

40. The method of claim 26, wherein the step of combining the position vector of each control point of the base surface model with the displacement vectors generated by the displacement fields at that control point includes calculating a vector sum.

41. The method of claim 26, wherein the rendering step includes using color values associated with the base surface model.

42. The method of claim 26, wherein the two-dimensional image includes a bit map.

43. The method of claim 26, wherein the subject's jaw is immobilized to minimize the differences in jaw position at different phases of a particular muscle movement.

44. A method for animating a face, comprising:
- acquiring a base surface model representing a three-dimensional shape of the face and including a set of control points;
- acquiring through three-dimensional measurement a set of displacement fields approximating motion patterns of a subject's face, each displacement field generating a three-dimensional displacement vector varying over the control points of the base surface model and over an intensity variable;
- generating a current intensity value for each displacement field in the set of displacement fields;
- combining the displacement vectors generated by the displacement fields at the control points and at the current intensity values with the positions of the control points to generate a deformed surface model;
- rendering the deformed surface model to generate a two-dimensional visual image of the face; and
- displaying or storing the two-dimensional image,
- wherein the step of acquiring the set of displacement fields includes acquiring a set of surface models approximating shapes of the subject's face,
- wherein the set of acquired surface models includes a sequence of surface models acquired from a sequence of facial poses involving a particular muscle movement,
- wherein a sequence of increasing intensity values is associated with this sequence of surface models, the intensity values representing degrees of muscle contraction for the muscle movement in the corresponding poses in the sequence of facial poses, and
- wherein the subject's jaw is immobilized to minimize differences in jaw position during different poses in the sequence of facial poses of the particular muscle movement.

45. A method for animating a face, comprising:
- acquiring a base surface model representing a three-dimensional shape of the face and including a set of control points;
- acquiring through three-dimensional measurement a set of displacement fields approximating motion patterns of a subject's face, each displacement field generating a three-dimensional displacement vector varying over the control points of the base surface model and over an intensity variable;
- generating a current intensity value for each displacement field in the set of displacement fields;
- combining the displacement vectors generated by the displacement fields at the control points and at the current intensity values with the positions of the control points to generate a deformed surface model;
- rendering the deformed surface model to generate a two-dimensional visual image of the face; and
- displaying or storing the two-dimensional image,
- wherein the step of acquiring the set of displacement fields includes acquiring a set of surface models approximating shapes of the subject's face,
- wherein the set of acquired surface models includes a sequence of surface models acquired from a sequence of facial poses involving a particular muscle movement, wherein a sequence of increasing intensity values is associated with this sequence of surface models, the intensity values representing degrees of muscle contraction for the muscle movement in the corresponding poses in the sequence of facial poses, wherein one of the displacement fields in the set of displacement fields is derived from the sequence of surface models, and wherein the derivation of the displacement field comprises the steps of:

re-positioning control points of the base surface model to fit the shape of each particular surface model in the sequence of surface models to produce a sequence of deformed surface models approximating the original sequence of surface models but having the control points of the base surface model;

calculating the displacements of the control points of the base surface model at each particular intensity value in the sequence of intensity values, by calculating the displacement of each control point from its position in the deformed surface model associated with the first intensity value in the sequence of intensity values to its position in the deformed surface model associated with the particular intensity value; and deriving the displacement field by determining the displacements of the control points of the base surface model at intensity values intermediate to the intensity values in the sequence of intensity values, by interpolating between the displacements at the intensity values in the sequence of intensity values.

46. The method of claim 45, wherein the step of interpolating the displacements at the intensity values in the sequence of intensity values includes performing a linear interpolation.

47. The method of claim 45, wherein the step of interpolating the displacements at the intensity values in the sequence of intensity values includes performing a non-linear interpolation.

48. The method of claim 45, wherein the step of re-positioning the control points of the base surface model to fit the shape of the particular surface model includes mapping the control points to positions in the surface of the particular surface model.

49. The method of claim 48, wherein the mapping of the control points of the base surface model to positions in the surface of the particular surface model includes mapping regions of the surface of the base surface model to corresponding regions of the surface of the particular surface model.

50. The method of claim 49, wherein each surface model in the set of surface models has associated with it a photographic image of the subject's face that is acquired by the surface acquisition system at the same time as the three-dimensional measurements used to make the surface model, the photographic image being mapped to the surface of the surface model as a texture; and wherein the mapping of regions of the surface of the base surface model to corresponding regions of the particular surface model includes usage of the textures of the two surface models.

51. The method of claim 50, wherein prior to acquiring the set of surface models a network of lines is drawn on the subject's face dividing it into regions, the network of lines consequently appearing in the texture of each surface model; and wherein the mapping of regions of the surface of the base surface model to corresponding regions of the particular surface model includes usage of the network of lines appearing in the textures of the two surface models.

* * * * *